United States Patent
Kong et al.

(10) Patent No.: US 11,924,793 B2
(45) Date of Patent: Mar. 5, 2024

(54) COMMUNICATION METHOD, TERMINAL, NETWORK DEVICE, AND STORAGE MEDIUM

(71) Applicant: HUAWEI TECHNOLOGIES CO., LTD., Guangdong (CN)

(72) Inventors: Chuili Kong, Hangzhou (CN); Gongzheng Zhang, Hangzhou (CN); Yunfei Qiao, Hangzhou (CN); Yinggang Du, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 69 days.

(21) Appl. No.: 17/508,564

(22) Filed: Oct. 22, 2021

(65) Prior Publication Data

US 2022/0046575 A1 Feb. 10, 2022

Related U.S. Application Data

(63) Continuation of application No. PCT/CN2020/081337, filed on Mar. 26, 2020.

(30) Foreign Application Priority Data

Apr. 23, 2019 (CN) .......................... 201910329275.2

(51) Int. Cl.
*H04W 56/00* (2009.01)
(52) U.S. Cl.
CPC .............................. *H04W 56/0045* (2013.01)
(58) Field of Classification Search
CPC . H04W 56/0045; H04W 56/00; H04W 48/10; H04W 48/12; H04B 7/1851
See application file for complete search history.

(56) References Cited

U.S. PATENT DOCUMENTS

| 10,547,374 | B1* | 1/2020 | Liu ........................ H04W 52/42 |
| 2008/0159419 | A1* | 7/2008 | Smith ................. H04L 27/2646 375/260 |
| 2012/0014371 | A1* | 1/2012 | Weng .................... H04J 3/0682 370/350 |

(Continued)

FOREIGN PATENT DOCUMENTS

| CN | 102647783 A | 8/2012 |
| CN | 103298136 A | 9/2013 |

(Continued)

OTHER PUBLICATIONS

Qualcomm Incorporated, "Remaining details on timing advance granularity and adjustment consideration," 3GPP TSG-RAN WG1 Meeting #92, R1-1802817, Athens, Greece, Feb. 26-Mar. 2, 2018, 5 pages.

(Continued)

*Primary Examiner* — Nathan S Taylor

(74) *Attorney, Agent, or Firm* — Fish & Richardson P.C.

(57) ABSTRACT

This application provides an example communication method. The example method includes a terminal device obtains a first message, where the first message includes target adjustment information. The terminal device obtains a second message, where the second message includes a timing advance (TA). The terminal device adjusts an uplink sending time based on the target adjustment information and the TA.

20 Claims, 7 Drawing Sheets

(56) References Cited

U.S. PATENT DOCUMENTS

| | | | |
|---|---|---|---|
| 2018/0254825 A1* | 9/2018 | Speidel | H04B 7/19 |
| 2018/0279334 A1 | 9/2018 | Lim et al. | |
| 2019/0158345 A1* | 5/2019 | Lincoln | H04W 24/10 |
| 2019/0306821 A1* | 10/2019 | Hu | H04W 56/0065 |
| 2019/0342000 A1* | 11/2019 | Zheng | H04B 7/18543 |
| 2019/0342845 A1* | 11/2019 | Laselva | H04B 7/18504 |
| 2019/0349077 A1* | 11/2019 | Alasti | H04W 74/0833 |
| 2019/0349877 A1* | 11/2019 | Alasti | H04B 7/2125 |
| 2019/0394770 A1* | 12/2019 | Wang | H04W 56/0055 |
| 2020/0295824 A1* | 9/2020 | Charbit | H04L 1/1854 |
| 2020/0329447 A1* | 10/2020 | Siomina | H04W 56/0005 |
| 2021/0029658 A1* | 1/2021 | Mahalingam | H04B 7/18513 |
| 2021/0175964 A1* | 6/2021 | Kusashima | H04B 7/18513 |
| 2021/0266855 A1* | 8/2021 | Akkarakaran | H04W 56/0015 |
| 2021/0321464 A1* | 10/2021 | Lin | H04W 76/11 |
| 2021/0345274 A1* | 11/2021 | Yuan | H04W 56/006 |
| 2021/0345280 A1* | 11/2021 | Zhang | H04W 72/1268 |
| 2022/0006514 A1* | 1/2022 | Sedin | H04L 1/1883 |
| 2022/0086786 A1* | 3/2022 | Narasimha | H04W 56/0005 |
| 2022/0150858 A1* | 5/2022 | Ren | H04W 74/0833 |
| 2022/0191946 A1* | 6/2022 | Nishio | H04L 27/2607 |

FOREIGN PATENT DOCUMENTS

| | | | | |
|---|---|---|---|---|
| CN | 107734631 A | 2/2018 | | |
| CN | 108271274 A | 7/2018 | | |
| CN | 109495961 A | 3/2019 | | |
| WO | 2019032343 A1 | 2/2019 | | |
| WO | WO-2021071606 A1 * | 4/2021 | | H04B 7/1555 |

OTHER PUBLICATIONS

Office Action issued in Chinese Application No. 201910329275.2 dated Mar. 2, 2021, 24 pages (with English translation).
Office Action issued in Chinese Application No. 201910329275.2 dated Jul. 29, 2021, 19 pages (with English translation).
PCT International Search Report and Written Opinion issued in International Application PCT/CN2020/081337 dated Jun. 18, 2020, 19 pages (with English translation).
EPO Partial Supplementary European Search Report issued in European Application No. 20795197.1 dated May 11, 2022, 16 pages.
Nokia et al., "Doppler Compensation, Uplink Timing Advance, Random Access and UE Location in NTN," 3GPP TSG RAN WG1 Meeting #96bis, R1-1904650, Xi'an, China, Apr. 8-12, 2019, 15 pages.
MediaTek Inc., "Timing Advance and RACH in NR-NTN," 3GPP TSG RAN WG1 Meeting #96bis, R1-1904655, Xi'an, China, Apr. 8-12, 2019, 4 pages.
Huawei et al., "Discussion on Timing Advance and RACH Procedures for NTN," 3GPP TSG RAN WG1 #96bis, R1-1904000, Xi'an, China, Apr. 8-12, 2019, 7 pages.
Ericsson, "On Random Access Procedures for NTN," 3GPP TSG-RAN WG2 #105bis, R2-1904518, Xi'an, China, Apr. 8-12, 2019, 4 pages.
Office Action in Japanese Appln. No. 2021-563075, dated Nov. 29, 2022, 9 pages (with English translation).
Extended European Search Report issued in European Application No. 20795197.1 dated Sep. 21, 2022, 16 pages.
Huawei et al., "Discussion on Timing Issues in Random Access for NTN," 3GPP TSG RAN WG1 Meeting #96, R1-1903199, Athens, Greece, Feb. 25-Mar. 1, 2019, 6 pages.
ZTE, "Discussion on the TA and PRACH for the NTN," 3GPP TSG RAN WG1 #96bis, R1-1904767, Xi'an, China, Apr. 8-12, 2019, 5 pages.
NEC, "Synchronization mechanism for NR sidelink," 3GPP TSG RAN WG1 #96bis, R1-1904655, Xi'an, China, Apr. 8-12, 2019, 5 pages.
Office Action in Japanese Appln. No. 2021-563075, dated Apr. 4, 2023, 5 pages (with English translation).

* cited by examiner

COMMUNICATION METHOD, TERMINAL, NETWORK DEVICE, AND STORAGE MEDIUM

CROSS-REFERENCE TO RELATED APPLICATIONS

This application is a continuation of International Patent Application PCT/CN2020/081337, filed on Mar. 26, 2020, which claims priority to Chinese Patent Application No. 201910329275.2, filed on Apr. 23, 2019. The disclosures of the aforementioned applications are hereby incorporated by reference in their entireties.

TECHNICAL FIELD

This application relates to the field of wireless telecommunication technology.

BACKGROUND

In a wireless communication system, uplink signals from different terminal devices need to arrive at a network device substantially at the same time, to ensure orthogonality of uplink transmission and avoid intra-cell interference. Therefore, the network device sends a timing advance (TA) to the terminal device, and the terminal device adjusts, based on the received TA, a time point at which an uplink signal is sent, to implement uplink timing synchronization between the terminal device and the network device. The timing advance is usually twice an amount of transmission time, and the twice an amount of transmission time is also referred to as round-trip time (RTT). After receiving downlink data, the terminal device usually performs uplink transmission after several slots, to ensure orthogonality of uplink transmission.

RTT is long for a satellite communication system. As a result, the terminal device cannot complete timing advance processing within duration of existing uplink transmission time. Therefore, in the satellite communication system, how to enable the terminal device to complete timing advance processing needs to be urgently resolved.

SUMMARY

Embodiments of this application provide a communication method, a terminal, a network device, and a storage medium, so that the terminal device can flexibly adjust uplink sending time based on target adjustment information and a TA, to ensure that the terminal device completes operations such as timing advance and signal processing, and ensure uplink orthogonality.

To resolve the foregoing technical problems, the embodiments of this application provide the following technical solutions.

A first aspect of this application provides a communication method. The communication method may be applied to various communication systems, for example, a long term evolution (LTE) system, an LTE frequency division duplex (FDD) system, an LTE time division duplex (TDD), a 5th generation (5G) mobile communication system, a new radio (NR) communication system, and a future mobile communication system. The method may include: A terminal device obtains a first message, where the first message carries target adjustment information. The terminal device may receive a first message sent by another device. For example, the terminal device receives a first message sent by the network device. Alternatively, that a terminal device obtains a first message may further include: The terminal device obtains a first message of the terminal device; or may include: The terminal device obtains a first message by searching for a channel. A specific manner in which the terminal device obtains the first message is not limited in this embodiment of this application. The first message carries the target adjustment information, and the target adjustment information is used by the terminal device to adjust uplink sending time. The terminal device obtains a second message, where the second message carries a timing advance (TA). The network device estimates the TA based on a random access preamble, and sends a message msg2 to the terminal device, where the message msg2 carries the TA. Certainly, the terminal device may alternatively obtain the TA in another manner. A manner in which the terminal device obtains the TA is not limited in this embodiment of this application. For example, the network device may determine a TA value of each terminal device by measuring uplink transmission of the corresponding terminal device. Therefore, provided that a terminal device performs uplink transmission, the network device can estimate a TA value, and send the TA value to the terminal device by using a downlink message. The terminal device adjusts the uplink sending time based on the target adjustment information and the TA. It can be learned from the first aspect that the terminal device may flexibly adjust the uplink sending time based on the target adjustment information, to ensure that the terminal device completes operations such as timing advance and signal processing, and ensure uplink orthogonality.

Optionally, with reference to the first aspect, in a first possible implementation, that the terminal device adjusts the uplink sending time based on the target adjustment information and the TA may include: The terminal device adjusts the uplink sending time based on the TA and a correspondence between the target adjustment information and a first subcarrier spacing, where the first subcarrier spacing is a subcarrier spacing used by the terminal device, the correspondence is prestored in the terminal device, and the correspondence is further prestored in the network device.

Optionally, with reference to the first aspect, in a second possible implementation, the target adjustment information is adjustment time of uplink sending time corresponding to a second subcarrier spacing. That the terminal device adjusts the uplink sending time based on the target adjustment information and the TA may include: When the subcarrier spacing of the terminal device is a third subcarrier spacing, the terminal device determines first time based on a preset relationship between the third subcarrier spacing and the second subcarrier spacing, where the first time is adjustment time of uplink sending time corresponding to the third subcarrier spacing; and the terminal device adjusts the uplink sending time based on the first time and the TA.

Optionally, with reference to the first aspect, or the first or the second possible implementation of the first aspect, in a third possible implementation, that a terminal device obtains a first message, where the first message carries target adjustment information may include: The terminal device receives a system information block (SIB) 1 message. Several different SIBs are defined in the NR communication system, and the SIBs are distinguished from each other by different types of information included in the SIBs. For example, in the NR, an SIB 1 provides initial access information of the terminal device, and an SIB 2 provides a cell reselection message. In the NR communication system, except that the SIB 1 is periodically broadcast at an interval of 160 ms, other SIBs may be transmitted in two manners: In one manner, these SIBs are periodically transmitted at a fixed time interval. In the other manner, after the terminal device accesses a network, these SIBs are sent at a request of the terminal device, to reduce signaling overheads. In a third possible implementation of the first aspect of this application, the SIB 1 message may carry the target adjustment information.

Optionally, with reference to the first aspect, or the first or the second possible implementation of the first aspect, in a fourth possible implementation, that a terminal device obtains a first message, where the first message carries target adjustment information may include: The terminal device receives a downlink control information (DCI) message; and the network device sends the DCI message to the terminal device, to perform data transmission between the network device and the terminal device. For example, the network device sends the DCI message to the terminal device through a PDCCH. The DCI message may include scheduling information of a data channel. Based on the scheduling information, the network device and the terminal device perform data transmission through the data channel. In a fourth possible implementation of the first aspect, the target adjustment information may be carried in the DCI message.

Optionally, with reference to the first aspect, or the first or the second possible implementation of the first aspect, in a fifth possible implementation, that a terminal device obtains a first message, where the first message carries target adjustment information may include: The terminal device receives a random access response message msg2. The message msg2 may include a cyclic redundancy check (CRC) code, and the CRC code is scrambled by using a random access radio network temporary identifier (RA-RNTI) and the target adjustment information. Before the terminal device adjusts the uplink sending time based on the target adjustment information and the TA, the method may further include: The terminal device performs a descrambling operation on the CRC code to obtain the target adjustment information. For example, when receiving the message msg2, the terminal device performs the descrambling operation on the CRC code by using RA-RNTI+ξ. If descrambling succeeds, the terminal device may obtain a value of ξ. For example, if the terminal device successfully obtains information through descrambling by using RA-RNTI+3, it is considered that ξ=3. For example, in this embodiment of this application, the value of ξ corresponds to SCS=15 kHz. For another subcarrier spacing, the value of ξ may be calculated according to $2^{\mu pusch} \xi$.

Optionally, with reference to the first aspect, or the first or the second possible implementation of the first aspect, in a sixth possible implementation, that a terminal device obtains a first message, where the first message carries target adjustment information may include: The terminal device receives a system information block (SIB) 1 message, where the SIB 1 message carries first target adjustment information; and the terminal device receives a downlink control information (DCI) message, where the DCI message carries second target adjustment information. That the terminal device adjusts the uplink sending time based on the target adjustment information and the TA may include: The terminal device adjusts the uplink sending time based on the first target adjustment information, the second target adjustment information, and the TA.

Optionally, with reference to the first aspect, or the first or the second possible implementation of the first aspect, in a seventh possible implementation, that a terminal device obtains a first message, where the first message carries target adjustment information may include: The terminal device receives a system information block (SIB) 1 message, where the SIB 1 message carries first target adjustment information; and the terminal device receives a downlink control information (DCI) message, where the DCI message carries second target adjustment information. The terminal device receives a random access response message msg2, where the message msg2 may include a cyclic redundancy check (CRC) code, and the CRC code is scrambled by using a random access radio network temporary identifier (RA-RNTI) and the target adjustment information. The terminal device performs a descrambling operation on the CRC code to obtain third target adjustment information. That the terminal device adjusts the uplink sending time based on the target adjustment information and the TA may include: The terminal device adjusts the uplink sending time based on the first target adjustment information, the second target adjustment information, the third target adjustment information, and the TA.

Optionally, with reference to the first aspect, in an eighth possible implementation, that a terminal device obtains a first message, where the first message carries target adjustment information includes: The terminal device obtains a physical cell identifier (PCI), where the PCI provides a cell identification function, so that the terminal device can distinguish between radio signals from different cells. Currently, there are a total of 1008 PCIs in a 5G NR system. In an area, a group of PCI values are used to distinguish between cells. In an area far from the area, the PCI values are reused accordingly. PCI values of cells covered by a satellite are different from each other, to distinguish between the cells. In an eighth possible implementation of the first aspect, the method may include: binding the PCI to an included angle α, where the included angle α is a horizontal included angle between a cell and the satellite. Before the terminal device adjusts the uplink sending time based on the target adjustment information and the TA, the method may further include: The terminal device obtains the target adjustment information through calculation based on the obtained included angle α and according to a preset formula.

Optionally, with reference to the first aspect, in a ninth possible implementation, that a terminal device obtains a first message, where the first message carries target adjustment information may include: The terminal device receives a broadcast message sent by a satellite, where the broadcast message carries location information of the satellite. Before the terminal device adjusts the uplink sending time based on the target adjustment information and the TA, the method may further include: The terminal device obtains the target adjustment information based on location information of the terminal device and the location information of the satellite.

Optionally, with reference to any one of the first aspect or the possible implementations of the first aspect, in a tenth possible implementation, the method may further include: After the terminal device receives a message msg3 scheduled and transmitted for the first time, starting a first timer after preset duration, where the first timer is configured to monitor a contention resolution message msg4. Specifically, after sending the message msg3, the terminal device starts the first timer to monitor the msg4, to resolve a contention conflict in random access. Description is provided by using an example in which the first timer is ra-ContentionResolutionTimer. The timer may support a maximum of 64 subframes. For a GEO satellite, the timer cannot cover RTT of more than 500 milliseconds. It is assumed that the msg4 is still monitored based on the timer. In this case, if the msg4 has not arrived after the timer expires, an unnecessary random access failure may occur. In a tenth possible implementation, a time point at which the first timer is started is offset by a preset value. For example, for the GEO satellite, the timer ra-ContentionResolutionTimer may be started 544 ms after the message msg3 is sent, to monitor the msg4. It should be noted that a range of the first timer may also be directly adjusted. For example, for a satellite system, a maximum timing length supportable by the first timer may be adjusted based on an actual requirement, for example, the maximum timing length supportable by the first timer may be changed to 500 subframes.

A second aspect of this application provides a communication method. The communication method may include: A network device sends a first message, where the first message carries target adjustment information; and the network device sends a second message, where the second message carries a timing advance (TA), and the target adjustment information and the TA are used by a terminal device to adjust uplink sending time.

Optionally, with reference to the second aspect, in a first possible implementation, the network device prestores a correspondence between the target adjustment information and a subcarrier spacing, where the correspondence is further stored in the terminal device.

Optionally, with reference to the second aspect, in a second possible implementation, the target adjustment information is adjustment information of uplink sending time corresponding to a target subcarrier spacing.

Optionally, with reference to the second aspect, or the first or the second possible implementation of the second aspect, in a third possible implementation, that a network device sends a first message, where the first message carries target adjustment information may include:

The network device sends a system information block (SIB) 1 message, where the SIB 1 message carries the target adjustment information.

Optionally, with reference to the second aspect, or the first or the second possible implementation of the second aspect, in a fourth possible implementation, that a network device sends a first message, where the first message carries target adjustment information may include: The network device sends a downlink control information (DCI) message, where the DCI message carries the target adjustment information.

Optionally, with reference to the second aspect, or the first or the second possible implementation of the second aspect, in a fifth possible implementation, that a network device sends a first message, where the first message carries target adjustment information may include: The network device sends a random access response message msg2, where the message msg2 may include a cyclic redundancy check (CRC), and the CRC code is scrambled by using a random access radio network temporary identifier (RA-RNTI) and the target adjustment information.

Optionally, with reference to the second aspect, or the first or the second possible implementation of the second aspect, in a sixth possible implementation, that a network device sends a first message, where the first message carries target adjustment information may include: The first network device sends a system information block (SIB) 1 message, where the SIB 1 message carries first target adjustment information; and the second network device sends a downlink control information (DCI) message, where the DCI message carries second target adjustment information.

A third aspect of this application provides a communication method. The method includes: A terminal device adjusts a first uplink sending time to a second uplink sending time, where the second uplink sending time is obtained by adding p slots to the first uplink sending time, and p is an integer greater than 4.

Optionally, with reference to the third aspect, in a first possible implementation, that a terminal device adjusts a first uplink sending time to a second uplink sending time may include: The terminal device adjusts the first uplink sending time to the second uplink sending time based on a first relationship, where the first relationship is prestored in the terminal device, and the first relationship is a correspondence between a first satellite and adjustment time of the first uplink sending time.

A fourth aspect of this application provides a communication system. The communication system may include a terminal device and a network device. The terminal device may be the terminal device described in any one of the first aspect or the possible implementations of the first aspect of this application, and the network device may be the network device described in any one of the second aspect or the possible implementations of the second aspect of this application.

A fifth aspect of this application provides a communication system. The communication system may include a terminal device and a network device. The terminal device may be the terminal device described in any one of the third aspect or the possible implementations of the third aspect of this application, and the network device may be the network device described in any one of the second aspect or the possible implementations of the second aspect of this application.

A sixth aspect of this application provides a terminal device. The terminal device has functions of implementing the method in any one of the first aspect or the possible implementations of the first aspect. The functions may be implemented by hardware, or may be implemented by hardware executing corresponding software. The hardware or the software includes one or more modules corresponding to the functions.

A seventh aspect of this application provides a terminal device. The terminal device has functions of implementing the method in any one of the third aspect or the possible implementations of the third aspect. The functions may be implemented by hardware, or may be implemented by hardware executing corresponding software. The hardware or the software includes one or more modules corresponding to the functions.

An eighth aspect of this application provides a network device. The network device has functions of implementing the method in any one of the second aspect or the possible implementations of the second aspect. The functions may be implemented by hardware, or may be implemented by hardware executing corresponding software. The hardware or the software includes one or more modules corresponding to the functions.

A ninth aspect of this application provides a terminal device, including: a storage unit, configured to store computer-readable instructions; a transceiver unit, configured to obtain a first message, where the first message carries target adjustment information, and the transceiver unit is further configured to obtain a second message, where the second message carries a timing advance (TA); and a processing unit, configured to adjust uplink sending time based on the computer-readable execution instructions stored in the storage unit and the target adjustment information and the TA that are obtained by the transceiver unit.

Optionally, with reference to the ninth aspect, in a first possible implementation, the storage unit is further configured to store a correspondence between the target adjustment information and the first subcarrier spacing. The processing unit is specifically configured to adjust the uplink sending time based on the correspondence between the target adjustment information and the first subcarrier spacing stored in the storage unit and the TA obtained by the transceiver unit, where the first subcarrier spacing is a subcarrier spacing used by the terminal device, and the correspondence is prestored in the terminal device.

Optionally, with reference to the ninth aspect, in a second possible implementation, the target adjustment information is adjustment time of uplink sending time corresponding to a second subcarrier spacing. When the subcarrier spacing of the terminal device is a third subcarrier spacing, the processing unit is specifically configured to determine first time according to a preset relationship between the third subcarrier spacing and the second subcarrier spacing, where the first time is adjustment time of the uplink sending time corresponding to the third subcarrier spacing. The processing unit is specifically configured to adjust the uplink sending time based on the first time and the TA.

Optionally, with reference to the ninth aspect, or the first or the second possible implementation of the ninth aspect, in a third possible implementation, the transceiver unit is specifically configured to receive a system information block (SIB) 1 message, where the SIB 1 message carries the target adjustment information.

Optionally, with reference to the ninth aspect, or the first or the second possible implementation of the ninth aspect, in a fourth possible implementation, the transceiver unit is specifically configured to receive a downlink control information (DCI) message, where the DCI message carries the target adjustment information.

Optionally, with reference to the ninth aspect, or the first or the second possible implementation of the ninth aspect, in a fifth possible implementation, the transceiver unit is specifically configured to receive a random access response message msg2, where the message msg2 includes a cyclic redundancy check (CRC), and the CRC code is scrambled by using a random access radio network temporary identifier (RA-RNTI) and the target adjustment information. The processing unit is further configured to perform a descrambling operation on the CRC code to obtain the target adjustment information.

Optionally, with reference to the ninth aspect, or the first or the second possible implementation of the ninth aspect, in a sixth possible implementation, the transceiver unit is specifically configured to receive a system information block (SIB) 1 message, where the SIB 1 message carries first target adjustment information. The transceiver unit is specifically configured to receive a downlink control information (DCI) message, where the DCI message carries second target adjustment information. The processing unit is specifically configured to adjust the uplink sending time based on the first target adjustment information, the second target adjustment information, and the TA.

Optionally, with reference to the ninth aspect, in a seventh possible implementation, the transceiver unit is specifically configured to obtain a physical cell identifier (PCI), where the PCI is bound to an included angle α, and the included angle α is a horizontal included angle between a cell and a satellite. The processing unit is further configured to obtain the target adjustment information through calculation based on the obtained included angle α and according to a preset formula.

Optionally, with reference to the ninth aspect, in an eighth possible implementation, the transceiver unit is specifically configured to receive a broadcast message sent by a satellite, where the broadcast message carries location information of the satellite. The processing unit is further configured to obtain the target adjustment information through calculation based on location information of the processing unit and the location information of the satellite and according to a preset formula.

Optionally, with reference to any one of the ninth aspect or the possible implementations of the ninth aspect, in a ninth possible implementation, the processing unit is further configured to: after the transceiver unit receives a message msg3 scheduled and transmitted for the first time, start a first timer after preset duration, where the first timer is configured to monitor a contention resolution message msg4.

Optionally, with reference to the ninth aspect, in a tenth possible implementation, the storage unit and the processing unit may be allocated as one unit.

A tenth aspect of this application provides a network device, including a storage unit, configured to store computer-readable instructions; and further including a transceiver unit coupled to the storage unit, configured to execute the computer-readable instructions in the storage unit, to perform the following operations: sending a first message, where the first message carries target adjustment information; and sending a second message, where the second message carries a timing advance (TA), and the target adjustment information and the TA are used by a terminal device to adjust uplink sending time.

Optionally, with reference to the tenth aspect, in a first possible implementation, the storage unit is specifically configured to store a correspondence between the target adjustment information and a subcarrier spacing, where the correspondence is further stored in the terminal device.

Optionally, with reference to the tenth aspect, in a second possible implementation, the target adjustment information is adjustment information of uplink sending time corresponding to the target subcarrier spacing.

Optionally, with reference to the tenth aspect, or the first or the second possible implementation of the tenth aspect, in a third possible implementation, the transceiver unit is specifically configured to send a system information block (SIB) 1 message, where the SIB 1 message carries the target adjustment information.

Optionally, with reference to the tenth aspect, or the first or the second possible implementation of the tenth aspect, in a fourth possible implementation, the transceiver unit is specifically configured to send a downlink control information (DCI) message, where the DCI message carries the target adjustment information.

Optionally, with reference to the tenth aspect, or the first or the second possible implementation of the tenth aspect, in a fifth possible implementation, the transceiver unit is specifically configured to send a random access response message msg2, where the message msg2 includes a cyclic redundancy check (CRC) code, and the CRC code is scrambled by using a random access radio network temporary identifier (RA-RNTI) and the target adjustment information.

Optionally, with reference to the tenth aspect, or the first or the second possible implementation of the tenth aspect, in a sixth possible implementation, the network device includes a first network device and a second network device. The first network device includes a first transceiver unit, and the second network device includes a second transceiver unit. The first transceiver unit is specifically configured to send a system information block (SIB) 1 message, where the SIB 1 message carries first target adjustment information.

The second transceiver unit is specifically configured to send a downlink control information (DCI) message, where the DCI message carries second target adjustment information.

An eleventh aspect of this application provides a computer-readable storage medium. The computer-readable storage medium stores instructions. When the instructions are run on a computer, the computer is enabled to perform the communication method according to any one of the first aspect or the possible implementations of the first aspect.

A twelfth aspect of this application provides a computer-readable storage medium. The computer-readable storage medium stores instructions. When the instructions are run on a computer, the computer is enabled to perform the communication method according to any one of the second aspect or the possible implementations of the second aspect.

A thirteenth aspect of this application provides a computer-readable storage medium. The computer-readable storage medium stores instructions. When the instructions are run on a computer, the computer is enabled to perform the communication method according to any one of the third aspect or the possible implementations of the third aspect.

A fourteenth aspect of this application provides a computer program product including instructions. When the instructions are run on a computer, the computer is enabled to perform the communication method according to any one of the first aspect or the possible implementations of the first aspect.

A fifteenth aspect of this application provides a computer program product including instructions. When the computer program product runs on a computer, the computer is enabled to perform the communication method according to any one of the second aspect or the possible implementations of the second aspect.

A sixteenth aspect of this application provides a computer program product including instructions. When the computer program product runs on a computer, the computer is enabled to perform the communication method according to any one of the third aspect or the possible implementations of the third aspect.

A seventeenth aspect of this application provides a chip system, where the chip system includes a processor, configured to support a terminal device to implement the functions in any one of the first aspect or the possible implementations of the first aspect. In a possible design, the chip system further includes a memory. The memory is configured to store program instructions and data that are necessary for the terminal device. The chip system may include a chip, or may include a chip and another discrete device.

An eighteenth aspect of this application provides a chip system, where the chip system includes a processor, configured to support a terminal device to implement the functions in any one of the third aspect or the possible implementations of the third aspect. In a possible design, the chip system further includes a memory. The memory is configured to store program instructions and data that are necessary for the terminal device. The chip system may include a chip, or may include a chip and another discrete device.

A nineteenth aspect of this application provides a chip system, where the chip system includes a processor, configured to support a network device to implement the functions in any one of the second aspect or the possible implementations of the second aspect. In a possible design, the chip system further includes a memory. The memory is configured to store program instructions and data that are necessary for the network device. The chip system may include a chip, or may include a chip and another discrete device.

In this embodiment of this application, the terminal device is allowed to flexibly adjust the uplink sending time based on the target adjustment information and the TA, to ensure that the terminal device completes operations such as timing advance and signal processing, and ensure uplink orthogonality.

DESCRIPTION OF EMBODIMENTS

Figure 1A:
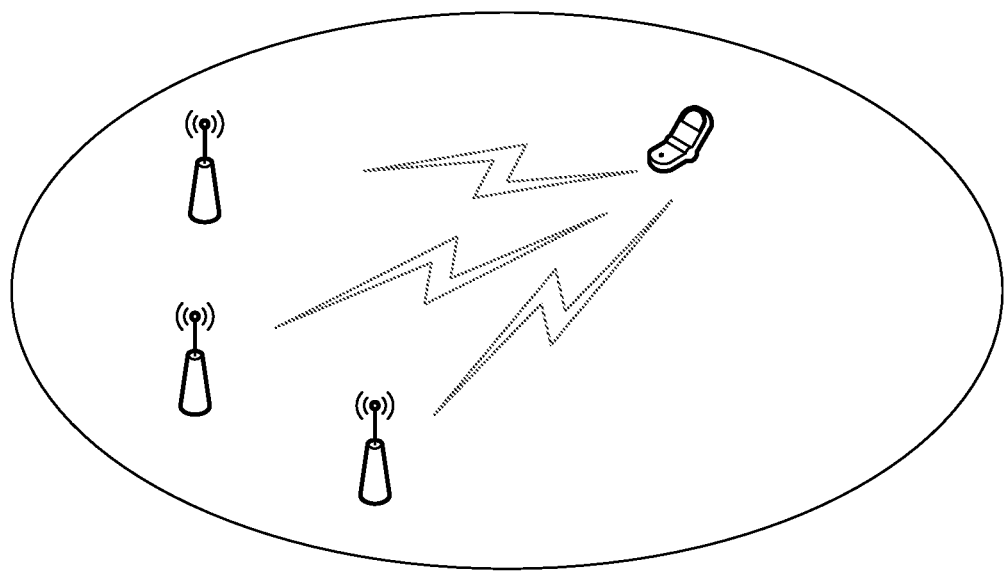
FIG. 1a is a schematic diagram of a wireless communication system to which an embodiment of this application is applied.

The following describes the embodiments of this application with reference to the accompanying drawings. It is clear that the described embodiments are merely some but not all of the embodiments of this application. A person of ordinary skill in the art may learn that, with technology development and emergence of a new scenario, the technical solutions provided in the embodiments of this application are also applicable to a similar technical problem.

The embodiments of this application provide a communication method, a terminal device, a network device, and a storage medium. A terminal device adjusts uplink sending time based on obtained target adjustment information and a TA, to ensure that the terminal device completes operations such as timing advance and signal processing, and ensures uplink orthogonality. Details are described in the following.

In the specification, claims, and accompanying drawings of this application, terms "first", "second", and so on are intended to distinguish between similar objects, but do not necessarily indicate a specific order or sequence. It should be understood that the data termed in such a way are interchangeable in appropriate circumstance, so that the embodiments described herein can be implemented in order other than the order illustrated or described herein. In addition, terms "include" and "have" and any variations thereof are intended to cover non-exclusive inclusions, for example, a process, method, system, product, or device including a series of steps or modules need not be limited to those clearly listed steps or modules, but may include other steps or modules that are not clearly listed or are inherent to these processes, methods, products, or devices. Naming or numbering of steps in this application does not mean that steps in the method procedure need to be performed according to a time/logical order indicated by the naming or numbering. An execution order of process steps that have been named or numbered may be changed according to a technical objective to be implemented, provided that a same or similar technical effect can be achieved. Division into the modules in this application is logical division. In actual application, there may be another division manner. For example, a plurality of modules may be combined or integrated into another system, or some features may be ignored or not performed. In addition, the displayed or discussed mutual coupling or direct coupling or communication connection may be through some ports, and the indirect coupling or communication connection between modules may be in an electrical form or another similar form. This is not limited in this application. In addition, modules or submodules described as separate components may or may not be physically separated, may or may not be physical modules, or may be distributed to a plurality of circuit modules. Some or all of the modules may be selected based on an actual requirement to implement the objectives of the solutions of this application.

It should be noted that in the embodiments of this application, "predefined" or "preset" indicates that corresponding code, a table, or another manner that can be used to indicate related information may be prestored in a device (for example, a terminal device or a network device). A specific implementation is not limited in this application. For example, predefined may refer to being defined in a protocol.

It should be further noted that in the embodiments of this application, terms "network" and "system" are usually interchangeably used, but meanings of the terms may be understood by a person skilled in the art. Terms "information", "signal", "message", and "channel" may be interchangeably used sometimes. It should be noted that meanings expressed by the terms are consistent when differences of the terms are not emphasized.

It should be further noted that, in the embodiments of this application, "reporting", "feedback" and variants thereof are usually interchangeably used, but meanings of the "reporting" and "feedback" may be understood by a person skilled in the art. For a terminal device, both reporting an ACK and feeding back an ACK may substantially refer to sending the ACK through a physical uplink channel. Therefore, in the embodiments of this application, "reporting" and "feedback" express consistent meanings when they do not need to be distinguished.

The technical solutions in the embodiments of this application may be applied to various communication systems, for example, a long term evolution (LTE) system, an LTE frequency division duplex (FDD) system, an LTE time division duplex (TDD), a 5th generation (5G) mobile communication system, a new radio (NR) communication system, and a future mobile communication system.

Figure 1B:
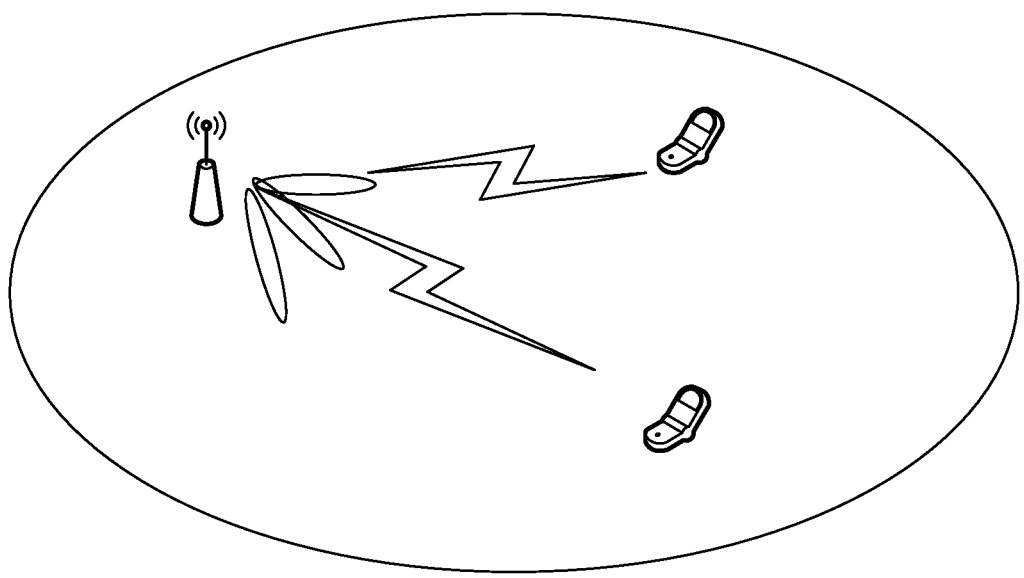
FIG. 1b is a schematic diagram of a wireless communication system to which an embodiment of this application is applied.

For ease of understanding the embodiments of this application, communication systems shown in FIG. 1a and FIG. 1b are first used as examples to describe in detail a communication system to which an embodiment of this application is applied. FIG. 1a and FIG. 1b are a schematic diagram of a wireless communication system to which an embodiment of this application is applied. As shown in FIG. 1a, the wireless communication system may include one or more network devices. Alternatively, as shown in FIG. 1b, the communication system may include one or more terminal devices. A single network device may transmit data or control signaling to a single terminal device or a plurality of terminal devices. Alternatively, a plurality of network devices may simultaneously transmit data or control signaling to a single terminal device. The wireless communication system may support coordinated multipoint transmission (CoMP). In other words, a plurality of cells or a plurality of network devices may coordinately participate in data transmission with one terminal device or jointly receive data sent by one terminal device, or a plurality of cells or a plurality of network devices may perform coordinated scheduling or coordinated beamforming. The plurality of cells may belong to a same network device or different network devices, and may be selected based on a channel gain or a path loss, received signal strength, a received signal instruction, or the like.

It should be understood that the network device in the wireless communication system may be any device that has wireless receiving and sending functions or a chip that may be disposed on the device. The device includes but is not limited to a nodeB, an evolved nodeB (eNB), a home nodeB, an access point (AP) in a wireless fidelity (Wi-Fi) system, a wireless relay node, a wireless backhaul node, a transmission point (TP) or a transmission and reception point (TRP), or the like. The device may further be a gNB in an NR system, or may be a component or a part of device that constitutes a base station, such as a central unit (CU), a distributed unit (DU), a baseband unit (BBU), or the like. It should be understood that a specific technology and a specific device form that are used by a radio access network device are not limited in the embodiments of this application. In this application, the radio access network device is referred to as a network device for short. Unless otherwise specified, the network device is the radio access network device in this application. In this application, the network device may be a network device itself, or may be a chip applied to the network device to complete a wireless communication processing function.

In some deployments, the gNB may include a CU and a DU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer. The DU implements functions of a radio link control (RLC) layer, a medium access control (MAC) layer, and a physical (PHY) layer. Information at the RRC layer is eventually converted into information at the PHY layer, or is converted from information at the PHY layer. Therefore, in this architecture, higher layer signaling, for example, RRC layer signaling or PHCP layer signaling, may also be considered as being sent by the DU, or sent by the DU and the RU. It may be understood that the network device may be a CU node, a DU node, or a device including a CU node and a DU node. In addition, the CU may be allocated as a network device in a radio access network (RAN), or the CU may be allocated as a network device in a core network (CN). This is not limited herein.

It should be further understood that the terminal device in the wireless communication system may also be referred to as a terminal, user equipment (UE), a mobile station (MS), a mobile terminal (MT), or the like. The terminal device in the embodiments of this application may be a mobile phone, a tablet computer (Pad), or a computer that has wireless receiving and sending functions, or may be a wireless device applied to scenarios such as virtual reality (VR), augmented reality (AR), industrial control, self driving, remote medical (remote medical), smart grid, transportation safety, smart city, and smart home. In this application, the foregoing terminal device and the chip applied to the terminal device are collectively referred to as a terminal device. It should be understood that a specific technology and a specific device form that are used by the terminal device are not limited in the embodiments of this application.

It should be understood that FIG. 1a or FIG. 1b schematically shows the network device and the terminal device for ease of understanding. However, this should not constitute any limitation on this application. The wireless communication system may further include more or less network devices, or may include more terminal devices. Network devices that communicate with different terminal devices may be a same network device, or may be different network devices. Quantities of network devices that communicate with different terminal devices may be the same or may be different. This application includes but is not limited thereto.

For the communication system shown in FIG. 1a or FIG. 1b, and in particular, for a communication system using orthogonal frequency division multiplexing (OFDM), orthogonality of uplink transmission needs to be ensured. To be specific, to avoid intra-cell interference, and cancel a propagation delay between different terminal devices, it is required that time points at which uplink signals from different terminal devices arrive at the network device are substantially aligned. In other words, it is ensured that the signals sent by the different terminal devices can arrive at the network device at the same time. Therefore, the network device sends a timing advance (TA) to the terminal device. By properly controlling an offset of each terminal device, the network device may control time points at which uplink signals from different terminal devices arrive at the network device. A terminal device closer to the network device may send uplink information based on a smaller timing advance. However, UE farther from the network device needs to send uplink information based on a larger timing advance because of a larger signal transmission delay. The terminal device adjusts uplink signal sending time based on the received TA, to implement uplink timing synchronization between the terminal device and the network device. The uplink timing synchronization may also be referred to as uplink time synchronization. From a perspective of the terminal device, the timing advance is essentially a negative offset between a start moment of a downlink subframe and a start moment of an uplink subframe. It should be noted that the timing advance is usually twice an amount of transmission time, and the twice an amount of transmission time is also referred to as round-trip time (RTT). In both a random access process of the terminal device and a case in which the terminal device is in a radio resource control connected (RRC_CONNECTED) mode, the network device needs to send a TA instruction to the terminal device. Specifically, in some implementations, the terminal device may obtain a timing advance of the terminal device in a random access process. In these examples, the terminal device may send a synchronization code on a physical random access channel (PRACH) by using zero timing advances, to initiate the random access process. The synchronization code may include a cyclic prefix (CP) added before at least one synchronization code sequence. In a particular implementation, a length of the cyclic prefix and a cyclic shift of the synchronization code sequence may be large enough that a base station can identify different synchronization code sequences sent by different wireless devices. When the network device detects a synchronization code, the network device may determine an identity of a synchronization code sequence and associated timing adjustment information that can be used for uplink synchronization. During a subsequent phase of the random access process, the timing adjustment information may be transmitted to a terminal device that has sent the identified synchronization code sequence. After completing the random access process, the terminal device may send, by using the timing adjustment information provided by the network device, an uplink signal that is received by the network device and that is substantially synchronized with another terminal device. After receiving downlink data, the terminal device usually performs uplink transmission after several slots, to ensure orthogonality of uplink transmission.

Figure 2:
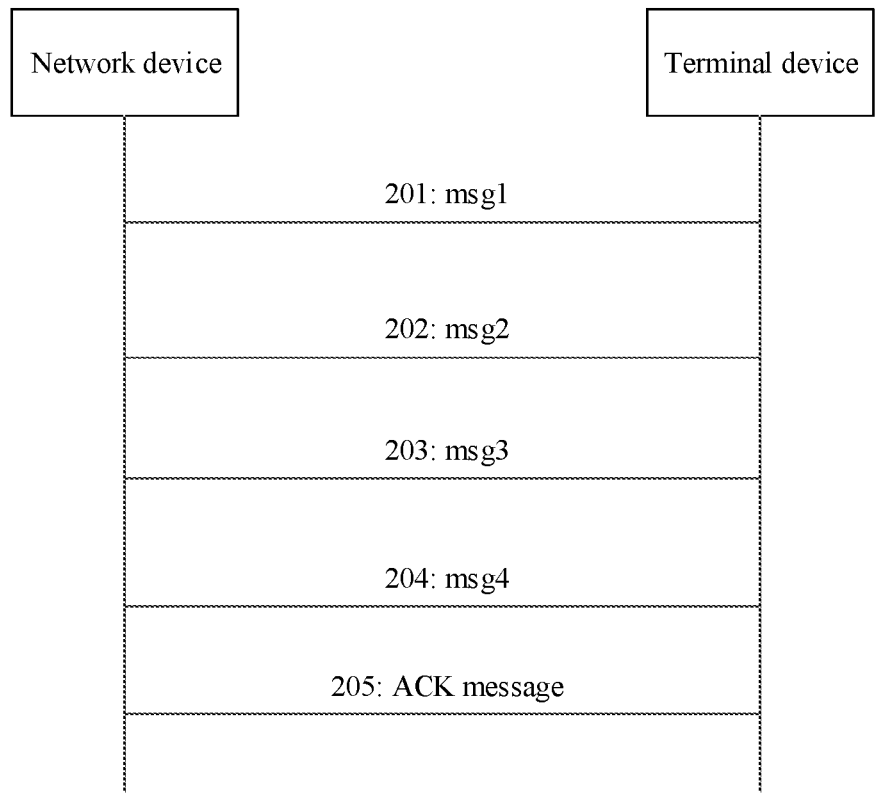
FIG. 2 is a schematic flowchart of a random access process in an NR system according to an embodiment of this application.

Uplink sending time is described in the following by using a general random access process between a terminal device and a network device as an example. The terminal device may be any terminal device that is in a wireless communication system and that has a wireless connection relationship with one or more network devices. FIG. 2 is a schematic flowchart of a random access process in an NR system. The random access process in the NR system may include the following steps.

201: A terminal device sends a random access preamble message (msg1) to a network device, and the network device receives the random access preamble message sent by the terminal device.

202: The network device estimates a TA based on the random access preamble message, and sends a random access response message (msg2) to the terminal device, where the message msg2 carries the TA; and the terminal device receives the random access response message sent by the network device, where the random access response message may further include a random preamble index and an uplink scheduling grant (UL grant).

203: The network device expects to receive a message msg3 in a $$\left[ n \times \frac{2^{\mu_{pusch}}}{2^{\mu_{pdcch}}} \right] + K_2 + \Delta^{th} \text{slot},$$

so that uplink sending time can cover duration of RTT, where μpusch represents a subcarrier spacing configuration parameter of a physical uplink shared channel (PUSCH) and μpdcch represents a subcarrier spacing configuration parameter of a physical downlink control channel (PDCCH). Because the subcarrier spacing configuration parameters are usually the same in one cell, a value of $$\frac{2^{\mu pusch}}{2^{\mu pdcch}}$$

is usually 1. The terminal device sends the scheduling transmission message 3 (msg3) based on a time domain location and a frequency domain location that are indicated in the uplink scheduling grant. Specifically, after receiving downlink control information (DCI) of the message msg3, the terminal device sends the message msg3 after the $(K2+\Delta)^{th}$ slot. It should be noted that the terminal device usually sends the message msg3 in the $(K2+\Delta-TA)^{th}$ slot, to ensure that the network device can receive, in the $(K2+\Delta)^{th}$ slot, the message msg3 sent by the terminal device. However, in a terrestrial network system, a value of the TA is small, and therefore may be ignored. In other words, it may be considered that the terminal device sends the message msg3 in the $(K2+\Delta)^{th}$ slot, and the network device may receive the message msg3 in the $(K2+\Delta)$th slot. Details are not described herein again. Values of K2 and $\Delta$ are predefined. For example, Table 1 to Table 4 provide values of K2 and $\Delta$.

TABLE 1

Default PUSCH time domain resource allocation in a normal CP

| Row index | PUSCH mapping type | K2 |
|---|---|---|
| 1 | typeA | j |
| 2 | typeA | j |
| 3 | typeA | j |
| 4 | typeB | j |
| 5 | typeB | j |
| 6 | typeB | j |
| 7 | typeB | j |
| 8 | typeA | j + 1 |
| 9 | typeA | j + 1 |
| 10 | typeA | j + 1 |
| 11 | typeA | j + 2 |
| 12 | typeA | j + 2 |
| 13 | typeA | j + 2 |
| 14 | typeB | j |
| 15 | typeA | j + 3 |
| 16 | typeA | j + 2 |

TABLE 2

Default PUSCH time domain resource allocation in an extended CP

| Row index | PUSCH mapping type | K2 |
|---|---|---|
| 1 | typeA | j |
| 2 | typeA | j |
| 3 | typeA | j |
| 4 | typeB | j |
| 5 | typeB | j |
| 6 | typeB | j |
| 7 | typeB | j |
| 8 | typeA | j + 1 |
| 9 | typeA | j + 1 |
| 10 | typeA | j + 1 |
| 11 | typeA | j + 2 |
| 12 | typeA | j + 2 |
| 13 | typeA | j + 2 |
| 14 | typeB | j |

TABLE 2-continued

Default PUSCH time domain resource allocation in an extended CP

| Row index | PUSCH mapping type | K2 |
|---|---|---|
| 15 | typeA | j + 3 |
| 16 | typeA | j + 3 |

TABLE 3

Values of j

| µpusch | j |
|---|---|
| 0 | 1 |
| 1 | 1 |
| 2 | 2 |
| 3 | 3 |

TABLE 4

Values of $\Delta$

| µpusch | $\Delta$ |
|---|---|
| 0 | 2 |
| 1 | 3 |
| 2 | 4 |
| 3 | 6 |

It may be obviously learned from Table 1 to Table 4 that last msg3 sending time supportable by the terminal device is $(j+3+\Delta)$ slots after the DCI message is received, and the $(j+3+\Delta)$ slots after the DCI message is received are the uplink sending time. When µpusch=0, that is, when a subcarrier spacing (SCS) is 15 kHz, $(j+3+\Delta)=6$. A relationship between µpusch and the subcarrier spacing is SCS=$2^{\mu pusch} \times 15$ kHz. This means that the last msg3 sending time supportable by the terminal device is six slots after the DCI of the message msg3 is received.

204: If the network device correctly receives the message msg3, the network device sends a message 4 (msg4) to the terminal device to resolve a conflict, where the conflict means that a plurality of terminal devices initiate a random access process by using a same uplink resource, but the network device considers that only one terminal device initiates random access. The network device sends a contention resolution message (msg4) to the terminal device.

205: Once the terminal device successfully obtains the msg4 through decoding, the terminal device needs to feed back acknowledgment (ACK) to the network device.

If the UE receives the msg4 in the $n^{th}$ slot and successfully decodes the msg4, the UE needs to feed back ACK in the $(n+k)^{th}$ slot. For downlink control information 1_0 (DCI 1_0), a maximum value of k is 8, that is, last time at which the terminal device sends ACK is eight slots after the msg4 is received. The DCI message refers to signaling transmitted on the PDCCH. The DCI message may be divided into a plurality of formats, and each format may carry different control signaling.

RTT is long for a satellite communication system. As a result, the terminal device cannot complete timing advance processing within duration of six or eight slots. For example, for a bent-pipe satellite in an equatorial geostationary orbit (GEO), RTT of the bent-pipe satellite may reach 544.751 ms, and the foregoing six or eight slots cannot cover duration of the RTT. It should be noted that when the SCS is 15 kHz, a time length corresponding to one slot is usually 1 ms; when the SCS is 30 kHz, a time length corresponding to one slot is usually 0.5 ms; or when the SCS is 60 kHz, a time length corresponding to one slot is usually 0.25 ms. Therefore, when the SCS is 30 kHz or 60 kHz, uplink sending time corresponding to the SCS cannot support the terminal device to complete timing advance processing.

Figure 3:
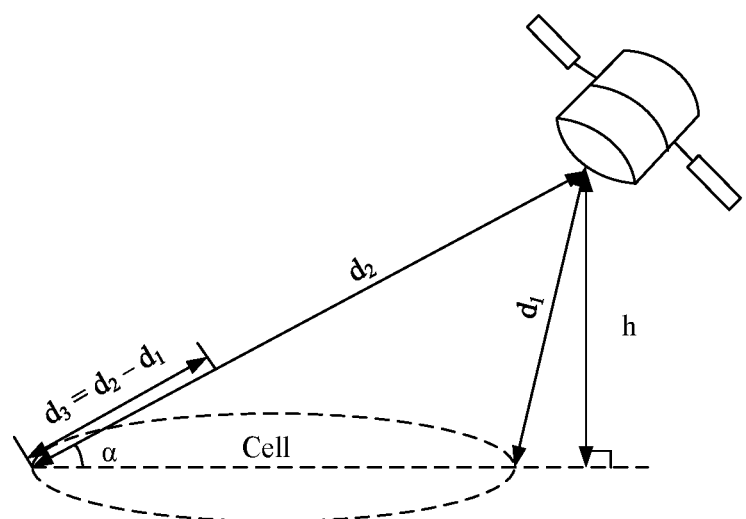
FIG. 3 is a schematic diagram of a distance from a terminal device to a satellite in a satellite system according to an embodiment of this application.
Figure 4:
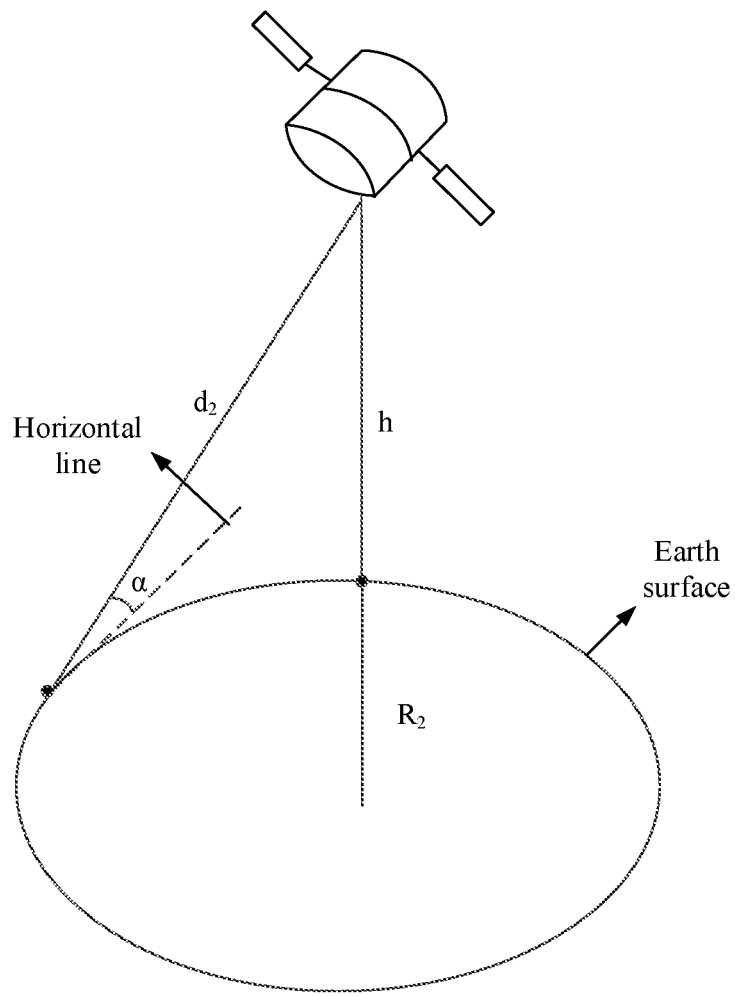
FIG. 4 is another schematic diagram of a distance from a terminal device to a satellite in a satellite system according to an embodiment of this application.

To resolve the foregoing technical problem, a solution is that the timing advance covers only a part of the RTT. Specific description is provided in the following with reference to FIG. 3 and FIG. 4. FIG. 3 is a schematic diagram of a distance from a terminal device to a satellite in a satellite system. The distance from the terminal device to the satellite is divided into two parts: a common distance and a remaining distance difference. As shown in FIG. 3, $d_1$ represents a common distance, which is a shortest distance between a cell in which the terminal device is located and the satellite. $d_3$ represents a remaining difference. Specifically, $d_3=d_2-d_1$, where $d_2$ represents an actual distance from the terminal device to the satellite. An objective of timing advance is to ensure that signals sent by different terminal devices can arrive at a network device at the same time. Therefore, in the satellite system, this objective can still be achieved if only a delay generated by $d_3$ is compensated for. $d_1$ and $d_2$ are first calculated to calculate $d_3$. It is assumed that a radius of a cell in which the terminal device is located is $R_1$, a radius of the earth is $R_2$, a vertical height from the satellite to the earth is h, and a horizontal included angle between the terminal device and the satellite is α. In this case, $d_2=\sqrt{R_2^2\sin^2\alpha+h^2+2hR_2}-R_2 \sin\alpha$, and $d_1=\sqrt{(d_2)^2+(2R_1)^2-4d_2R_1\cos\alpha}$. Variables in the formula are given in FIG. 4. It can be learned, from $d_3=d_2-d_1$, that a value of $d_3$ is related to the cell radius $R_1$, the horizontal included angle α between the terminal device and the satellite, and the vertical height h from the satellite to the earth. For example, Table 5 shows cell radii supported by the satellite at different orbital altitudes.

TABLE 5

Cell radii supported by satellites at different orbital altitudes

| Satellite type | Orbital altitude (h) | Supported cell radius (Ri) |
|---|---|---|
| Low Earth orbit (LEO) | 300-1500 km | 50-250 km |
| Medium Earth orbit (MEO) | 7000-25000 km | 50-250 km |
| GEO | 35786 km | 100-500 km |
| Unmanned aircraft system (UAS) | 8-50 km | 2.5-100 km |
| High elliptical orbit (HEO) | 400-50000 km | 100-500 km |

The value of $d_3$ is calculated in the following by using a GEO satellite as an example. For example, Table 6 provides values of $d_3$ corresponding to different α when a maximum radius supported by the GEO satellite is 500 km. Table 7 provides values of $d_3$ corresponding to different α when a typical cell radius supported by the GEO satellite is 250 km.

TABLE 6

$d_3$ corresponding to different tilt angles when a radius is 500 km

| α | h | $R_1$ | $d_2$ | $d_1$ | $d_3$ |
|---|---|---|---|---|---|
| 10 degrees | 35786 km | 500 km | 40581 km | 39597 km | 984 km |
| 20 degrees | 35786 km | 500 km | 39551 km | 38613 km | 938 km |
| 30 degrees | 35786 km | 500 km | 38609 km | 37746 km | 863 km |

TABLE 6-continued $d_3$ corresponding to different tilt angles when a radius is 500 km

| α | h | $R_1$ | $d_2$ | $d_1$ | $d_3$ |
|---|---|---|---|---|---|
| 40 degrees | 35786 km | 500 km | 37778 km | 37018 km | 760 km |
| 50 degrees | 35786 km | 500 km | 37077 km | 36442 km | 635 km |
| 60 degrees | 35786 km | 500 km | 36519 km | 36029 km | 490 km |
| 70 degrees | 35786 km | 500 km | 36114 km | 35784 km | 330 km |
| 80 degrees | 35786 km | 500 km | 35868 km | 35708 km | 160 km |

TABLE 7

$d_3$ corresponding to different tilt angles when a radius is 500 km

| α | h | $R_1$ | $d_2$ | $d_1$ | $d_3$ |
|---|---|---|---|---|---|
| 10 degrees | 35786 km | 250 km | 40581 km | 40089 km | 492 km |
| 20 degrees | 35786 km | 250 km | 39551 km | 39081 km | 470 km |
| 30 degrees | 35786 km | 250 km | 38609 km | 38177 km | 432 km |
| 40 degrees | 35786 km | 250 km | 37778 km | 37397 km | 381 km |
| 50 degrees | 35786 km | 250 km | 37077 km | 36758 km | 319 km |
| 60 degrees | 35786 km | 250 km | 36519 km | 36272 km | 247 km |
| 70 degrees | 35786 km | 250 km | 36114 km | 35946 km | 168 km |
| 80 degrees | 35786 km | 250 km | 35868 km | 35785 km | 83 km |

In a 5G new radio (NR) system, designed sending time, that is, the described uplink sending time, is designed for the cell radius $R_1$ of 300 km. If $d_3$ is larger in the satellite system, the sending time needs to be re-designed. For example, it can be learned from Table 6 that, when the radius is 500 km and α is 10 degrees, the value of $d_3$ is 983 km, a difference between $d_3$ and an existing cell radius is $d_4$=984 km−300 km=684 km, and a delay generated by $d_4$ is 684/c and is approximately equal to 2.28 ms, where c represents a speed of light. The timing advance of the terminal device is used to cover the round-trip delay, that is, twice the difference. Therefore, in this scenario, the uplink sending time needs to be increased by about 4.45 ms. It can be learned from the foregoing analysis that, for the satellite system, this solution is applicable only to a scenario in which $d_3$ is less than $R_1$, but not to a scenario in which $d_3$ is greater than $R_1$.

To resolve the foregoing problem, the embodiments of this application provide a communication method, to flexibly compensate for and adjust uplink transmission time to ensure that a terminal device completes timing advance and another signal processing operation. The following specifically describes the communication method provided in the embodiments of this application.

Figure 5:
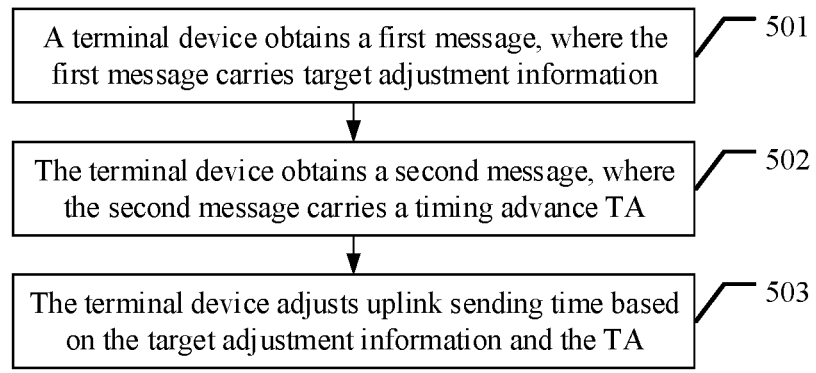
FIG. 5 is a schematic diagram of an embodiment of a communication method according to embodiments of this application.

FIG. 5 is a schematic diagram of an embodiment of a communication method according to the embodiments of this application.

As shown in FIG. 5, this embodiment of the communication method in the embodiments of this application may include the following steps.

501: A terminal device obtains a first message, where the first message carries target adjustment information.

That a terminal device obtains a first message may include: The terminal device receives a first message sent by another device. For example, the terminal device receives a first message sent by the network device. Alternatively, that a terminal device obtains a first message may further include: The terminal device obtains a first message of the terminal device; or may include: The terminal device obtains a first message by searching for a channel. A specific manner in which the terminal device obtains the first message is not limited in this embodiment of this application. The first message carries the target adjustment information, and the target adjustment information is used by the terminal device to adjust uplink sending time.

502: The terminal device obtains a second message, where the second message carries a timing advance (TA).

The network device estimates the TA based on a random access preamble, and sends a message msg2 to the terminal device, where the message msg2 carries the TA. Certainly, the terminal device may alternatively obtain the TA in another manner. A manner in which the terminal device obtains the TA is not limited in this embodiment of this application. For example, the network device may determine a TA value of each terminal device by measuring uplink transmission of the corresponding terminal device. Therefore, provided that a terminal device performs uplink transmission, the network device can estimate a TA value, and send the TA value to the terminal device by using a downlink message.

It should be noted that, in a specific embodiment, the first message and the second message may be a same message, that is, the target adjustment information and the TA may be carried in one message. This is not specifically limited in this embodiment of this application.

503: The terminal device adjusts the uplink sending time based on the target adjustment information and the TA.

After receiving the target adjustment information and the TA, the terminal device adjusts the uplink sending time. For example, in a possible case, before the terminal device receives the target adjustment information, the uplink sending time of the terminal device is a moment T1. After receiving the target adjustment information, the terminal device adjusts the uplink sending time to a moment T2 based on the target adjustment information. The moment T2 may be a moment obtained by delaying the moment T1 by t slots, that is, T2=T1+t slots. For further description, it is assumed that the moment T1 is the $(K2+\Delta-TA)^{th}$ slot after the terminal device receives the DCI of the message msg3, where K2 and Δ may be understood based on K2 and Δ that are described in the flowchart corresponding to FIG. 2. Details are not described herein again. The moment T2 is the $(K2+\Delta-TA+t)^{th}$ slot after the terminal device receives the DCI of the message msg3.

It can be learned from the embodiment corresponding to FIG. 5 that the terminal device may flexibly adjust the uplink sending time based on the target adjustment information, to ensure that the terminal device completes operations such as timing advance and signal processing, and ensure uplink orthogonality.

It can be learned from the embodiment corresponding to FIG. 5 that the terminal device needs to adjust the uplink sending time based on the target adjustment information and the TA. The terminal device may obtain the target adjustment information in different manners. A manner in which the terminal device obtains the target adjustment information and adjusts the uplink sending time based on the target adjustment information is described in detail in the following.

Figure 6:
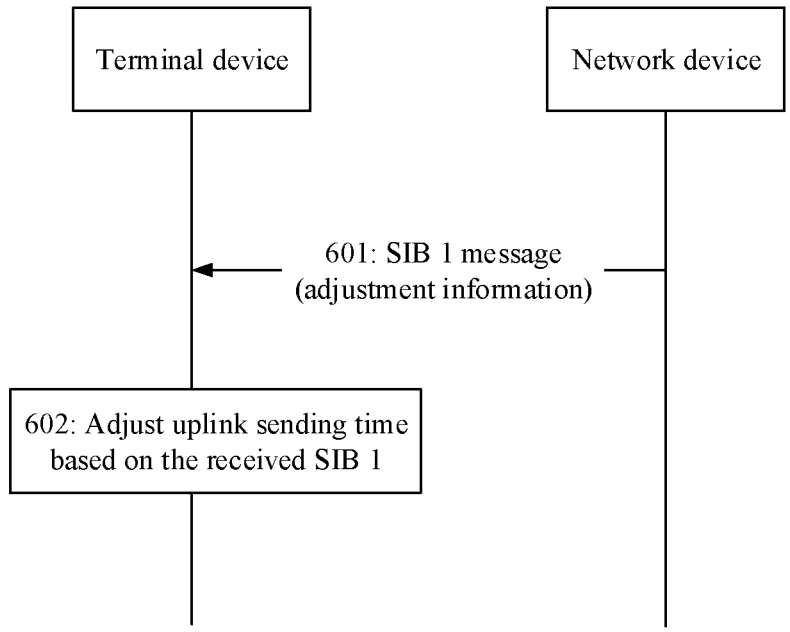
FIG. 6 is a schematic diagram of another embodiment of a communication method according to embodiments of this application.

FIG. 6 is a schematic diagram of an embodiment of a communication method according to the embodiments of this application.

As shown in FIG. 6, this embodiment of the communication method in the embodiments of this application may include the following steps.

601: A terminal device receives a system information block (SIB) 1 message sent by a network device.

Several different SIBs are defined in an NR communication system, and different types of information included in the SIBs are used to distinguish between the SIBs. For example, in the NR, an SIB 1 provides initial access information of the terminal device, and an SIB 2 provides a cell reselection message. In the NR communication system, except that the SIB 1 is periodically broadcast at an interval of 160 ms, other SIBs may be transmitted in two manners: In one manner, these SIBs are periodically transmitted at a fixed time interval. In the other manner, after the terminal device accesses a network, these SIBs are sent at a request of the terminal device, to reduce signaling overheads. In a random access process, sending the message msg3 by the terminal device is performing common uplink scheduling. This means that the terminal device needs to learn of adjusted uplink sending time in random access. It should be noted that, in the embodiments of this application, the uplink transmission time, the uplink data sending time, the uplink signal sending time, and the uplink sending time are often interchangeably used, but a person skilled in the art may understand meanings thereof. Therefore, in the embodiments of this application, the uplink transmission time, the uplink data sending time, the uplink signal sending time, and the uplink sending time express consistent meanings when they do not need to be distinguished. Therefore, to ensure that the terminal device can learn of the adjusted uplink sending time before random access, the SIB 1 message carries adjustment information of the uplink sending time in this embodiment of this application. The following describes how to add the adjustment information to the SIB 1 in detail.

For example, to clearly describe a manner in which the adjustment information is added to the SIB 1, description is provided in the following by using a GEO satellite as an example. It should be noted that a person skilled in the art may clearly obtain, according to the embodiments disclosed in this application, a manner in which adjustment information is added to the SIB 1 for another satellite such as an LEO satellite or an MEO satellite. In addition, unless otherwise specified, the GEO satellite is used as an example for description in the embodiments of this application, but the method provided in the embodiments of this application is still applicable to the another satellite such as the LEO satellite or the MEO satellite. A person skilled in the art may clearly obtain, based on the method disclosed in the embodiments provided in this application, a method for adjusting uplink sending time by another satellite system. Details are not described in the following embodiments.

For the GEO satellite, maximum additional duration that is required is approximately 4.55 ms. If a case in which the subcarrier spacing is 15 kHz is considered, a quantity ξ of slots that need to be added is 5. In a group of examples, Table 8 provides values of ξ at different SCSs.

TABLE 8

Values of ξ at different SCSs

| μpusch | SCS | ξ |
|---|---|---|
| 0 | 15 kHz | 5 |
| 1 | 30 kHz | 10 |
| 2 | 60 kHz | 20 |
| 3 | 120 kHz | 40 |

The SIB 1 includes a plurality of information elements (IE), for example, an information element describing cell access related information and an information element describing a cell identity. In a specific embodiment, 3-bit information may be added to cell access related information, to indicate a value of ξ when SCS=15 kHz. Because the terminal device learns of a subcarrier spacing configuration of the terminal device, an additional increase amount of the uplink sending time of the terminal device is $2^{\mu_{pusch}}\xi$.

In a specific embodiment, a new field may be added to the SIB 1. The field may occupy three bits, a specific range of the three bits is integer (0, 5), and remaining values of the three bits are "reserved". The newly added field may be used to indicate the value of $\xi$ when SCS=15 kHz.

602: The terminal device adjusts uplink sending time based on the received SIB 1.

After receiving the SIB 1, the terminal device adjusts the existing uplink sending time based on the value of $\xi$ carried in the SIB 1.

In a specific embodiment, the terminal device adjusts the uplink sending time based on a correspondence between $\xi$ and a first subcarrier spacing. The first subcarrier spacing is a subcarrier spacing used by the terminal device, and the correspondence may be prestored in the terminal device and the satellite. For example, the terminal device and the satellite prestore a correspondence between a subcarrier spacing and $\xi$. The terminal device learns of a subcarrier spacing used by the terminal device. When receiving specific $\xi$, the terminal device may adjust the uplink sending time based on a prestored correspondence between a subcarrier spacing and $\xi$.

In a specific embodiment, $\xi$ is adjustment time of uplink sending time corresponding to a second subcarrier spacing. When the subcarrier spacing of the terminal device is a third subcarrier spacing, the terminal device determines first time based on a preset relationship between the third subcarrier spacing and the second subcarrier spacing. The first time is adjustment time of uplink sending time corresponding to the third subcarrier spacing. The terminal device adjusts the uplink sending time based on the first time. For example, the value of $\xi$ is indicated when SCS=15 kHz. If the value of $\xi$ carried in the SIB 1 is 5 and the terminal device determines that μpusch of the terminal device is 0, the terminal device needs to add five more slots to the existing uplink sending time. In a random access process, that is, after the terminal device receives DCI of the message msg3, the terminal device sends the message msg3 after a maximum of T1+5 slots, where T1 is uplink sending time present before the terminal device receives the SIB 1.

It can be learned from the embodiment corresponding to FIG. 6 that a satellite lays several beams to serve several cells, and the satellite broadcasts the value of $\xi$. Specifically, the value of $\xi$ is transmitted by using the SIB 1 message. When receiving the SIB 1 message, the terminal device may obtain the value of $\xi$, and adjust the uplink sending time based on the value of $\xi$.

Figure 7:
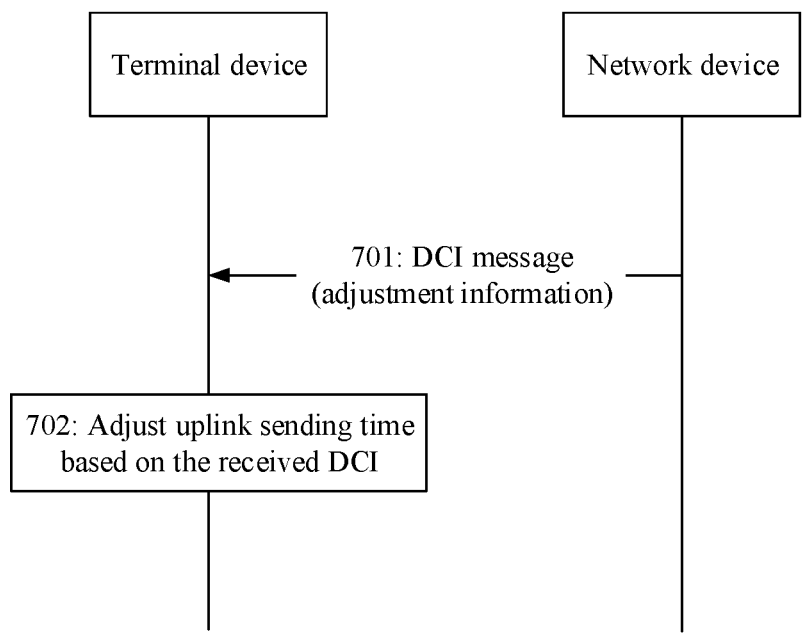
FIG. 7 is a schematic diagram of another embodiment of a communication method according to embodiments of this application.

FIG. 7 is a schematic diagram of an embodiment of a communication method according to the embodiments of this application.

As shown in FIG. 7, this embodiment of the communication method in the embodiments of this application may include the following steps.

701: A terminal device receives a downlink control information (DCI) message sent by a network device.

The network device sends the DCI message to the terminal device, to be used for data transmission between the network device and the terminal device. For example, the network device sends the DCI message to the terminal device through a PDCCH. The DCI message may include scheduling information of a data channel. Based on the scheduling information, the network device and the terminal device perform data transmission through the data channel. In this embodiment of this application, the DCI message may carry an indication for adjusting the uplink sending time. For example, three-bit information may be added to the DCI message to indicate adjustment of the uplink sending time. For example, Table 9 shows DCI 1_0 in an NR system in which three bits are added to indicate adjustment of the uplink sending time. It should be noted that the indication for adjusting the uplink sending time may also be referred to as adjustment information, and a name of the adjustment information is not limited in this embodiment of this application.

TABLE 9

| DCI 1_0 obtained after the three bits are added | | |
|---|---|---|
| Region | Bit quantity | Note |
| DCI format indication | 1 | Determines whether the DCI is uplink or downlink. |
| Frequency domain resource allocation | N | Indicates a location of an RB, where a quantity of occupied bits is related to a bandwidth. |
| Time domain resource allocation | 4 | Indicates time domain resource allocation. |
| VRB-to-PRB mapping | 1 | Indicates whether interleaving occurs. |
| MCS | 5 | Indicates a modulation scheme, a bit rate, and a TB size. |
| NDI | 1 | Indicates whether the data is newly transmitted. |
| RV | 2 | Indicates a transmitted redundancy version. |
| Quantity of HARQ processes | 4 | Indicates a quantity of HARQ processes for transmission or retransmission. |
| DAI | 2 | Is used when a dynamic HARQ codebook is configured. |
| HARQ feedback time | 3 | Indicates ACK/NACK sending time. |
| PDCCH power control | 2 | indicates to adjust PUCCH sending power. |
| Uplink sending time adjustment | 3 | Indicates an extra delay for sending uplink data. |

It should be noted that the embodiment corresponding to FIG. 7 may be applied together with the embodiment corresponding to FIG. 6. For example, in a specific embodiment, uplink sending time that needs to be adjusted over a common distance may be indicated by using the SIB 1 message in the embodiment corresponding to FIG. 6, to cover RTT over the common distance; uplink sending time that needs to be adjusted over a remaining difference distance may be indicated by using the DCI message in the embodiment corresponding to FIG. 7, to cover RTT over the remaining difference distance. For example, it is assumed that a first terminal device and a second terminal device are located in a same cell, and an included angle $\alpha_1$ corresponding to the first terminal device is greater than an included angle $\alpha_2$ corresponding to the second terminal device. If uplink sending time of the first terminal device needs to be adjusted by a total of 562 ms, and uplink sending time of the second terminal device needs to be adjusted by a total of 563 ms, the SIB 1 message may be used to indicate the first terminal device and the second terminal device to adjust respective uplink sending time by 560 ms, then the first DCI message may be used to indicate the first terminal device to adjust the uplink sending time by 2 ms, and the second DCI message may be used to indicate the second terminal to adjust the uplink sending time by 3 ms.

For example, Table 10 shows a mapping relationship, between bit information in the DCI 1_0 and $\xi$, present when SCS=15 kHz. In this embodiment of this application, a value of $\xi$ may be indicated based on that SCS=15 kHz. Because the terminal device learns of a subcarrier spacing configuration of the terminal device, an additional increase amount of the uplink sending time of the terminal device is $2^{\mu pusch}\xi$. It should be noted that value indication of $\xi$ based on SCS=15 kHz is merely used as an example, and does not represent a limitation on indication information. This is also applicable to the following value indication of $\xi$ based on SCS=15 kHz. Details are not described again in subsequent embodiments.

TABLE 10

Mapping relationship between bit information in DCI 1_0 and $\xi$

| Bit information | $\xi$ |
| --- | --- |
| 000 | 0 |
| 001 | 1 |
| 010 | 2 |
| 011 | 3 |
| 100 | 4 |
| 101 | 5 |
| 110 | reserved |
| 111 | reserved |

In a specific embodiment, if a resource that can be added to the DCI message is limited, for example, only 2-bit or 1-bit information can be added, a discontinuous mapping manner may be used. For example, Table 11 shows a mapping relationship between bit information in the DCI 1_0 and $\xi$ when only 2-bit information can be added. For example, Table 12 shows a mapping relationship between bit information in the DCI 1_0 and $\xi$ when only 1-bit information can be added.

TABLE 11

Another mapping relationship between bit information in DCI 1_0 and $\xi$

| Bit information | $\xi$ |
| --- | --- |
| 00 | 0 |
| 01 | 2 |
| 10 | 4 |
| 11 | 5 |

TABLE 12

Another mapping relationship between bit information in DCI 1_0 and $\xi$

| Bit information | $\xi$ |
| --- | --- |
| 0 | 2 |
| 1 | 5 |

702: The terminal device adjusts uplink sending time based on the received DCI message.

After receiving the DCI message, the terminal device adjusts the existing uplink sending time based on the value of $\xi$ carried in the DCI message.

In a specific embodiment, the terminal device adjusts the uplink sending time based on a correspondence between $\xi$ and a first subcarrier spacing. The first subcarrier spacing is a subcarrier spacing used by the terminal device, and the correspondence may be prestored in the terminal device and a satellite. For example, the terminal device and the satellite prestore a correspondence between a subcarrier spacing and $\xi$. The terminal device learns of a subcarrier spacing used by the terminal device. When receiving specific $\xi$, the terminal device may adjust the uplink sending time based on a prestored correspondence between a subcarrier spacing and $\xi$.

In a specific embodiment, that the terminal device adjusts uplink sending time based on $\xi$ may include: $\xi$ is adjustment time of uplink sending time corresponding to a second subcarrier spacing. When the subcarrier spacing of the terminal device is a third subcarrier spacing, the terminal device determines first time based on a preset relationship between the third subcarrier spacing and the second subcarrier spacing. The first time is adjustment time of uplink sending time corresponding to the third subcarrier spacing. The terminal device adjusts the uplink sending time based on the first time. For example, if the value of $\xi$ carried in the DCI message is 1, and the terminal device determines that µpusch of the terminal device is 0, the terminal device should add one more slot to the existing uplink sending time. Alternatively, if the terminal device determines that µpusch of the terminal device is 1, the terminal device obtains 2 through calculation based on $2^{\mu pusch}\xi$, that is, the terminal device should add two more slots to the existing uplink sending time.

Figure 8:
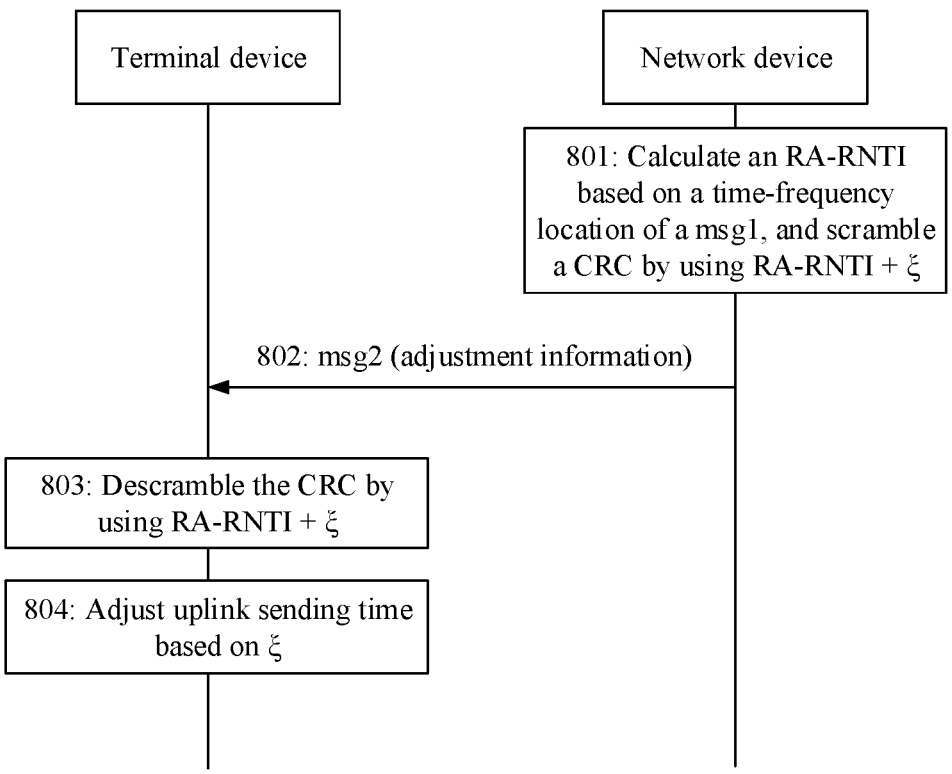
FIG. 8 is a schematic diagram of another embodiment of a communication method according to embodiments of this application.

FIG. 8 is a schematic diagram of an embodiment of a communication method according to the embodiments of this application.

As shown in FIG. 8, this embodiment of the communication method in the embodiments of this application may include the following steps.

801: A network device calculates a random access radio network temporary identifier (RA-RNTI) based on a time-frequency location of a message msg1, and scrambles a cyclic redundancy check (CRC) code.

The network device sends control information to a terminal device through a control channel, to support communication between the network device and the terminal device. The network device sends the control channel to the terminal device. For example, the control channel is a PDCCH. A CRC code of the information carried on the control channel is scrambled by using a corresponding radio network temporary identifier (RNTI), to perform transmission error detection of the control channel. The terminal device receives the control channel, and decodes the control channel based on the corresponding RNTI to obtain scheduling information of a data channel. In this case, the terminal device can communicate with the network device through the data channel based on the scheduling information. When in different states, the terminal device may perform descrambling by using different RNTIs. For example, in a random access process, the terminal device performs descrambling by using an RA-RNTI in a state of waiting for a reply from the network device, to obtain an uplink resource allocation message. In this embodiment of this application, the network device calculates the RA-RNTI based on the time-frequency location in which the message msg1 is received, and scrambles the CRC code. The calculated RA-RNTI may be offset to some extent, to indicate a quantity of additional slots for uplink transmission. To be specific, scrambling is performed by using RA-RNTI+$\xi$, where a value of $\xi$ may be $\{0, 1, 2, 3, 4, 5\}$. In the embodiment corresponding to FIG. 8, the CRC code may be considered as a type of adjustment information.

802: The network device sends a message msg2 to the terminal device, where the message msg2 includes the CRC code.

803: The terminal device performs a descrambling operation on the CRC code based on the received message msg2 by using RA-RNTI+$\xi$.

When receiving the message msg2, the terminal device performs the descrambling operation on the CRC code by using RA-RNTI+$\xi$. If descrambling succeeds, the terminal device may obtain a value of $\xi$. For example, if the terminal device successfully obtains information through descrambling by using RA-RNTI+3, it is considered that $\xi=3$. For example, in this embodiment of this application, the value of $\xi$ corresponds to SCS=15 kHz. For another subcarrier spacing, the value of $\xi$ may be calculated according to $2^{\mu pusch}\xi$.

804: The terminal device adjusts the uplink sending time based on

In a specific embodiment, the terminal device adjusts the uplink sending time based on a correspondence between $\xi$ and a first subcarrier spacing. The first subcarrier spacing is a subcarrier spacing used by the terminal device, and the correspondence may be prestored in the terminal device and a satellite. For example, the terminal device and the satellite prestore a correspondence between a subcarrier spacing and $\xi$. The terminal device learns of a subcarrier spacing used by the terminal device. When receiving specific $\xi$, the terminal device may adjust the uplink sending time based on a prestored correspondence between a subcarrier spacing and $\xi$.

In a specific embodiment, that the terminal device adjusts uplink sending time based on $\xi$ may include: $\xi$ is adjustment time of uplink sending time corresponding to a second subcarrier spacing. When the subcarrier spacing of the terminal device is a third subcarrier spacing, the terminal device determines first time based on a preset relationship between the third subcarrier spacing and the second subcarrier spacing. The first time is adjustment time of uplink sending time corresponding to the third subcarrier spacing. The terminal device adjusts the uplink sending time based on the first time. For example, if the terminal device successfully obtains information through descrambling by using RA-RNTI+3, it is considered that $\xi=3$. If the terminal device determines that μpusch of the terminal device is 0, the terminal device determines to add three more slots to the existing uplink sending time. Alternatively, if the terminal device determines that μpusch of the terminal device is 1, the terminal device determines, according to $2^{\mu pusch}\xi=6$, to add six more slots to the existing uplink sending time.

It should be noted that the embodiment corresponding to FIG. 8 may be applied together with the embodiment corresponding to FIG. 7 and the embodiment corresponding to FIG. 6. For example, in a specific embodiment, uplink sending time that needs to be adjusted over a common distance may be indicated by using the SIB 1 message in the embodiment corresponding to FIG. 6, to cover RTT over the common distance; uplink sending time that needs to be adjusted over a remaining difference distance may be indicated by using the DCI message in the embodiment corresponding to FIG. 7 and the message msg2 in the embodiment corresponding to FIG. 8, to cover RTT over the remaining difference distance. For example, it is assumed that a first terminal device and a second terminal device are located in a same cell, and an included angle $\alpha_1$ corresponding to the first terminal device is greater than an included angle $\alpha_2$ corresponding to the second terminal device. If uplink sending time of the first terminal device needs to be adjusted by a total of 562.5 ms, and uplink sending time of the second terminal device needs to be adjusted by a total of 563.3 ms, the SIB 1 message may be used to indicate the first terminal device and the second terminal device to adjust respective uplink sending time by 560 ms. Then, the first DCI message may be used to indicate the first terminal device to adjust the uplink sending time by 2 ms, and the second DCI message may be used to indicate the second terminal to adjust the uplink sending time by 3 ms. A first message msg2 may be used to indicate the first terminal device to further adjust the uplink sending time by 0.5 ms, and a second message msg2 may be used to indicate the first terminal device to further adjust the uplink sending time by 0.3 ms. The first terminal device and the second terminal need to obtain values of $\xi$ through scrambling after receiving the message msg2. Details are not described herein again.

In a satellite system, because of a large timing advance, the timing advance may also be divided into two parts: a common timing advance and a remaining difference part. Generally, because the common timing advance is the same for different terminal devices in a cell, the common timing advance is carried in the SIB 1 and delivered to the terminals in a broadcast manner, to reduce overheads. The remaining difference part is carried in the DCI message or the message msg2. Therefore, after receiving the DCI message or decoding the message msg2, the terminal devices obtain the remaining difference part. In this case, the remaining difference part is used based on the obtained value of after subsequent uplink transmission.

Figure 9:
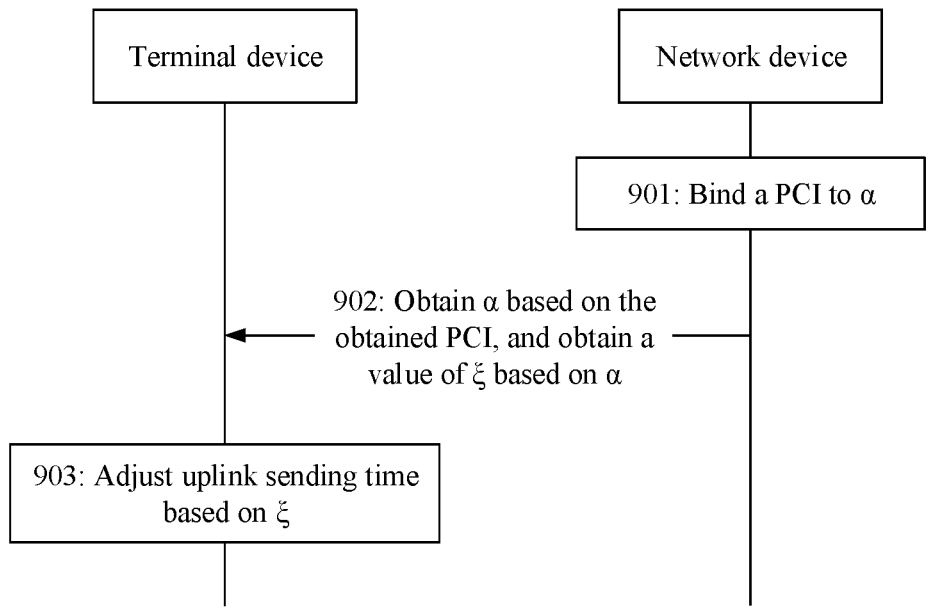
FIG. 9 is a schematic diagram of another embodiment of a communication method according to embodiments of this application.

FIG. 9 is a schematic diagram of an embodiment of a communication method according to the embodiments of this application.

As shown in FIG. 9, this embodiment of the communication method in the embodiments of this application may include the following steps.

901: A network device binds a physical cell identifier (PCI) to an included angle $\alpha$ in advance.

The PCI provides a cell identification function, so that a terminal device can distinguish between radio signals from different cells. Currently, there are a total of 1008 PCIs in a 5G NR system. In an area, a group of PCI values are used to distinguish between cells. In an area far from the area, the PCI values are reused accordingly. PCI values of cells covered by a satellite are different from each other, to distinguish between the cells. In this embodiment of this application, the PCI value may be bound to the included angle $\alpha$ in advance. After obtaining the PCI, the terminal device may obtain $\alpha$ through calculation, and further obtain, through calculation, additional delay time required for uplink sending, to finally obtain a value of $\xi$. For example, Table 13 shows values of $d_3$ corresponding to different included angles α that are presented when SCS=15 kHz and a cell radius is 500 km. It should be noted that the PCI values shown in Table 13 are merely examples, and the PCI values may be specifically allocated during actual networking.

TABLE 13

$d_3$ corresponding to different α when a radius is 500 km

| α | PCI | ξ |
|---|-----|---|
| 10 | 1 | 5 |
| 20 | 2 | 5 |
| 30 | 8 | 4 |
| 40 | 13 | 4 |
| 50 | 65 | 3 |
| 60 | 89 | 2 |
| 70 | 102 | 1 |
| 80 | 536 | 0 |

902: The terminal device obtains α based on the obtained PCI, and obtains a value of ξ based on α.

The terminal device may determine a PCI of a cell based on a synchronization channel. After obtaining the PCI, the terminal device may obtain an included angle α bound to the PCI, and obtains a value of ξ through calculation based on the included angle α. For a specific calculation formula, refer to the formula provided in the scenario described in FIG. 3 or FIG. 4. Details are not described herein again. α in this embodiment of this application may be considered as a horizontal included angle between a satellite and a terminal device that is farthest from the satellite in a cell. It should be noted that a manner in which the terminal device obtains the PCI is not limited in this embodiment of this application. For example, the terminal device may further obtain the PCI by using a sequence combination of a detected primary synchronization signal (PSS) and a detected secondary synchronization signal (SSS).

903: The terminal device adjusts uplink sending time based on a value of ξ.

After obtaining ξ, the terminal device increases the existing uplink sending time based on the value of ξ, and determines specific time at which uplink data is sent. For example, if the obtained ξ is 5, and the terminal device determines that μpusch of the terminal device is 0, the terminal device should add five more slots to the existing uplink sending time. Alternatively, if the terminal device determines that μpusch of the terminal device is 1, the terminal device obtains 10 through calculation based on $2^{\mu pusch}\xi$, that is, the terminal device should add 10 more slots to the existing uplink sending time.

Figure 10:
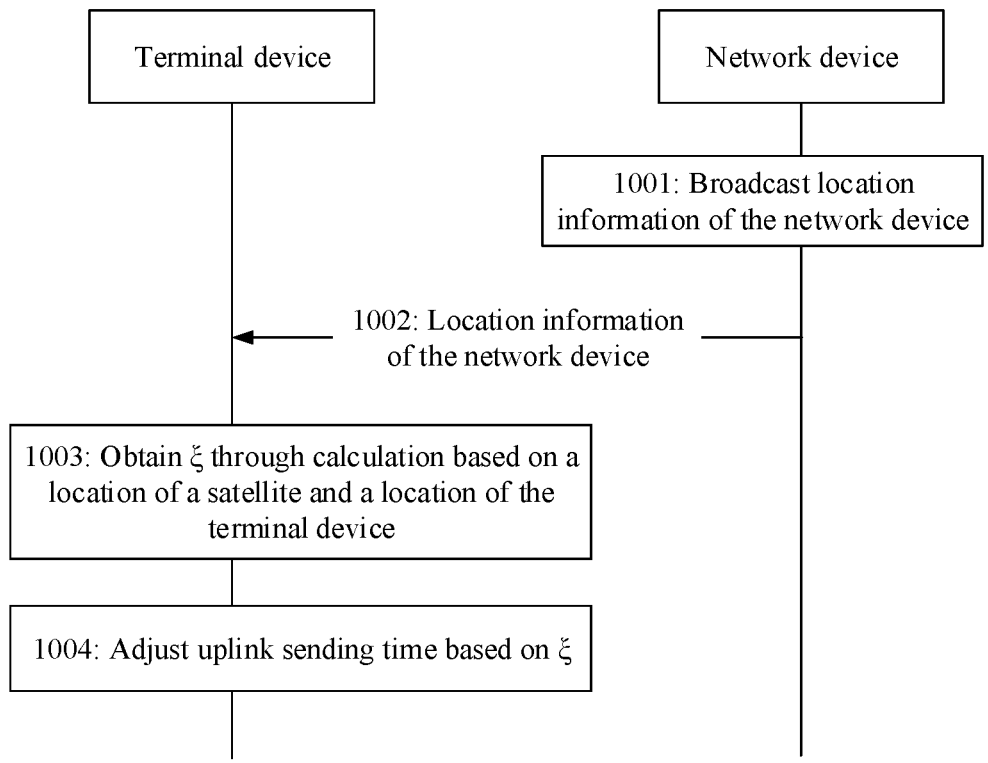
FIG. 10 is a schematic diagram of another embodiment of a communication method according to embodiments of this application.

FIG. 10 is a schematic diagram of an embodiment of a communication method according to the embodiments of this application.

As shown in FIG. 10, this embodiment of the communication method in the embodiments of this application may include the following steps.

1001: A network device broadcasts location information of the network device.

An ephemeris is a table of accurate locations or tracks of a satellite that vary with time in global positioning system measurement. In this embodiment of this application, the network device may be a satellite. The satellite broadcasts location information of the satellite, which may be expressed by using, for example, coordinates (X, Y, Z).

1002: The network device sends the location information of the network device to the terminal device.

1003: A terminal device obtains a value of ξ through calculation based on a location of the satellite and a location of the terminal device.

If a positioning apparatus is configured for the terminal device, for example, a GPS is configured for the terminal device, the terminal device may learn of the location information of the terminal device, which may be expressed by using, for example, coordinates (x, y, z). The terminal device may learn of a distance and a tilt angle between the satellite and the terminal device based on coordinate information of the satellite and coordinate information of the terminal device. If a cell radius is set, values of $d_1$ and $d_2$ may be obtained through calculation according to a preset formula, a value of $d_3$ may be further obtained through calculation, and finally a value of ξ is obtained through calculation. For a specific calculation formula, refer to the formula provided in the scenario described in FIG. 3 or FIG. 4. Details are not described herein again.

1004: The terminal device adjusts uplink sending time based on a value of ξ.

After obtaining ξ, the terminal device increases the existing uplink sending time based on the value of ξ, and determines specific time at which uplink data is sent. For example, if the obtained ξ is 5, and the terminal device determines that μpusch of the terminal device is 0, the terminal device should add five more slots to the existing uplink sending time. Alternatively, if the terminal device determines that μpusch of the terminal device is 1, the terminal device obtains 10 through calculation based on $2^{\mu pusch}\xi$, that is, the terminal device should add 10 more slots to the existing uplink sending time.

In a specific embodiment, each of different terminal devices may add m more slots to the existing uplink sending time, and the m slots are additional uplink sending time required by a terminal device that is farthest from the satellite in a cell.

In a specific embodiment, the terminal device adjusts first uplink sending time to second uplink sending time based on a first relationship. The first relationship is prestored in the terminal device, and the first relationship is a correspondence between a first satellite and adjustment time of the first uplink sending time.

In a specific embodiment, based on the embodiments corresponding to FIG. 5 to FIG. 10, the following may be further included: After sending a message msg3, the terminal device starts a first timer after preset duration. The first timer is configured to monitor the msg4. Specifically, after sending the message msg3, the terminal device starts the first timer to monitor the msg4, to resolve a contention conflict in random access. Description is provided by using an example in which the first timer is ra-ContentionResolutionTimer. The timer may support a maximum of 64 subframes. For a GEO satellite, the timer cannot cover RTT of more than 500 milliseconds. It is assumed that the msg4 is still monitored based on the timer. In this case, if the msg4 has not arrived after the timer expires, an unnecessary random access failure may occur. In this embodiment of this application, the time at which the first timer is started is offset by a preset value. For example, after the GEO satellite sends the message msg3, the terminal device may start the timer ra-ContentionResolutionTimer after 544 ms to monitor the msg4. It should be noted that a range of the first timer may also be directly adjusted. For example, for a satellite system, a maximum timing length supportable by the first timer may be adjusted based on an actual requirement, for example, the maximum timing length supportable by the first timer may be changed to 500 subframes.

The foregoing mainly describes the solutions provided in the embodiments of this application from a perspective of interaction between the network device and the terminal device. It may be understood that, to implement the foregoing functions, the foregoing network device and terminal device include corresponding hardware structures and/or software modules for performing the functions. A person of ordinary skill in the art should be easily aware that, modules and algorithm steps of the examples described with reference to the embodiments disclosed in this specification may be implemented in this application by hardware or a combination of hardware and computer software. Whether a specific function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In terms of hardware structures, the terminal device and the network device in FIG. 5 to FIG. 10 may be implemented by one physical device, may be jointly implemented by a plurality of physical devices, or may be a logical function module in one physical device. This is not specifically limited in this embodiment of this application.

Figure 11:
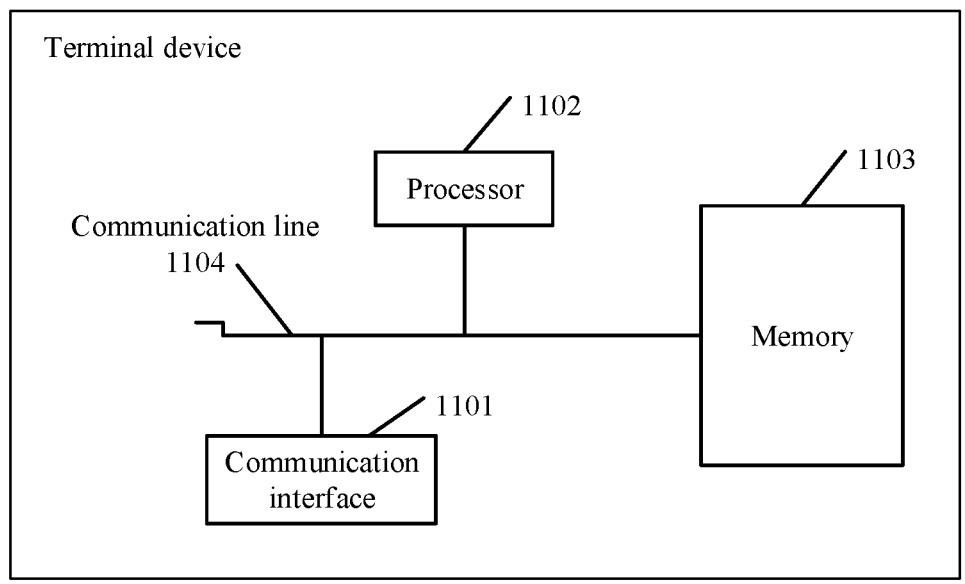
FIG. 11 is a schematic diagram of a structure of hardware of a communication device according to an embodiment of this application.

For example, the terminal device may be implemented by a communication device in FIG. 11. FIG. 11 is a schematic diagram of a hardware structure of the communication device according to an embodiment of this application. The communication device includes a communication interface 1101 and a processor 1102, and may further include a memory 1103.

The communication interface 1101 may be any apparatus such as a transceiver, and is configured to communicate with another device or a communication network such as the Ethernet, a radio access network (RAN), or a wireless local area network (WLAN).

The processor 1102 includes but is not limited to one or more of a central processing unit (CPU), a network processor (NP), an application-specific integrated circuit (ASIC), or a programmable logic device (PLD). The PLD may be a complex programmable logic device (CPLD), a field-programmable logic gate array (FPGA), generic array logic (GAL), or any combination thereof. The processor 1102 is responsible for management of communication line 1104 and general processing, and may further provide various functions, including timing, peripheral interfacing, voltage regulation, power management, and another control function. The memory 1103 may be configured to store data used by the processor 1102 when the processor 1102 performs an operation.

The memory 1103 may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM), another optical disk storage, an optical disc storage (including a compact disc, a laser disc, an optical disc, a digital versatile disc, a Blu-ray disc, and the like), a disk storage medium, another magnetic storage device, or any other medium that can be used to carry or store expected program code in a form of an instruction or a data structure and that can be accessed by a computer. However, this is not limited thereto. The memory may exist independently, and is connected to the processor 1102 through the communication line 1104. Alternatively, the memory 1103 may be integrated into the processor 1102. If the memory 1103 and the processor 1102 are mutually independent components, the memory 1103 is connected to the processor 1102. For example, the memory 1103 and the processor 1102 may communicate with each other through the communication line. The memory 1103 may communicate with the processor 1102 through the communication line, or the memory 1103 may be directly connected to the processor 1102.

The communication line 1104 may include any quantity of interconnected buses and bridges, and the communication line 1104 links together various circuits including one or more processors 1102 represented by the processor 1102 and a memory represented by the memory 1103. The communication line 1104 may further link various other circuits such as a peripheral device, a voltage stabilizer, and a power management circuit. These are well known in the art, and therefore are not further described in this application.

In a specific implementation, the terminal device may include a memory, configured to store computer-readable instructions.

The terminal device may further include a communication interface coupled to the memory, configured to perform the following operations:

obtaining a first message, where the first message carries target adjustment information; and obtaining a second message, where the second message carries a timing advance (TA).

The terminal device may further include a processor coupled to the communication interface, configured to execute the computer-readable instructions in the memory, to perform the following operation:

adjusting uplink sending time based on the target adjustment information and the TA that are obtained through the communication interface.

In a specific implementation, the memory is further configured to store a correspondence between the target adjustment information and a first subcarrier spacing.

The processor is specifically configured to adjust the uplink sending time based on the correspondence between the target adjustment information and the first subcarrier spacing stored in the memory and the TA obtained through the communication interface, where the first subcarrier spacing is a subcarrier spacing used by the terminal device, and the correspondence is prestored in the terminal device.

In a specific implementation, the target adjustment information is adjustment time of uplink sending time corresponding to a second subcarrier spacing. The processor is specifically configured to: when the subcarrier spacing of the terminal device is a third subcarrier spacing, determine first time based on a preset relationship between the third subcarrier spacing and the second subcarrier spacing, where the first time is adjustment time of uplink sending time corresponding to the third subcarrier spacing.

The processor is specifically configured to adjust the uplink sending time based on the first time and the TA.

In a specific implementation, the communication interface is specifically configured for the device to receive a system information block (SIB) 1 message, where the SIB 1 message carries the target adjustment information.

In a specific implementation, the communication interface is specifically configured to receive a downlink control information (DCI) message, where the DCI message carries the target adjustment information.

In a specific implementation, the communication interface is specifically configured to receive a random access response message msg2, where the message msg2 includes a cyclic redundancy check (CRC) code, and the CRC code is scrambled by using a random access radio network temporary identifier (RA-RNTI) and the target adjustment information.

The processor is further configured to perform a descrambling operation on the CRC code to obtain the target adjustment information.

In a specific implementation, the communication interface is specifically configured to receive a system information block (SIB) 1 message, where the SIB 1 message carries first target adjustment information.

The communication interface is specifically configured to receive a downlink control information (DCI) message, where the DCI message carries the second target adjustment information.

The processor is specifically configured to adjust the uplink sending time based on the first target adjustment information, the second target adjustment information, and the TA.

In a specific implementation, the communication interface is specifically configured to obtain a physical cell identifier (PCI), where the PCI is bound to an included angle α, and the included angle α is a horizontal included angle between a cell and a satellite.

The processor is further configured to obtain the target adjustment information through calculation based on the obtained included angle α and according to a preset formula.

In a specific implementation, the communication interface is specifically configured to receive a broadcast message sent by the satellite, where the broadcast message carries location information of the satellite.

The processor is further configured to obtain the target adjustment information through calculation based on location information of the processor and the location information of the satellite and according to a preset formula.

In a specific implementation, the processor is further configured to: after the communication interface receives a message msg3 scheduled and transmitted for the first time, start a first timer after preset duration, where the first timer is used to monitor a contention resolution message msg4

In a specific implementation, the memory and the processor may be integrated.

In this embodiment of this application, the communication interface may be considered as a transceiver unit of the terminal device, the processor that has a processing function may be considered as a processing unit of the terminal device, and the memory may be considered as a storage unit of the terminal device.

Figure 12:
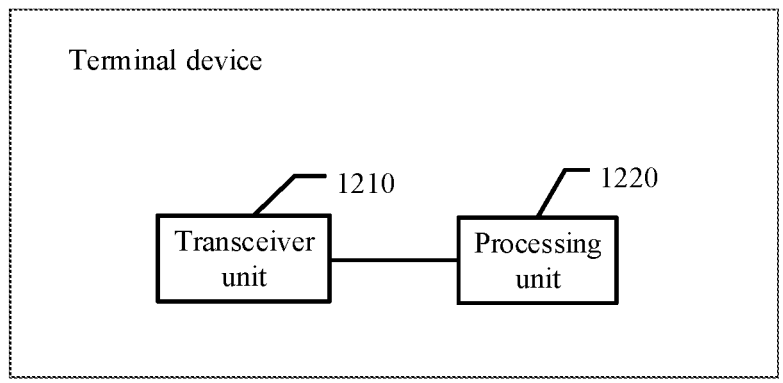
FIG. 12 is a schematic diagram of a structure of a terminal device according to an embodiment of this application.

As shown in FIG. 12, a terminal device includes a transceiver unit 1210 and a processing unit 1220. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1210 and that is configured to implement a receiving function may be considered as a receiving unit, and a component that is in the transceiver unit 1210 and that is configured to implement a sending function may be considered as a sending unit. In other words, the transceiver unit 1210 includes the receiving unit and the sending unit. The transceiver unit sometimes may also be referred to as a transceiver machine, a transceiver, a transceiver circuit, or the like. The receiving unit sometimes may also be referred to as a receiving machine, a receiver, a receiving circuit, or the like. The sending unit sometimes may also be referred to as a transmitter machine, a transmitter, a transmitter circuit, or the like.

In a specific implementation, the transceiver unit 1210 is configured to perform the obtaining operations on a terminal device side in steps 501 and 502 in FIG. 5, and/or the transceiver unit 1210 is further configured to perform other receiving and sending steps on the terminal device side in the embodiments of this application. The processing unit 1220 is configured to perform step 503 in FIG. 2, and/or the processing unit 1220 is further configured to perform another processing step on the terminal device side in the embodiments of this application.

In a specific implementation, the transceiver unit 1210 is configured to perform the receiving operation on the terminal device side in step 601 in FIG. 6, and/or the transceiver unit 1210 is further configured to perform receiving and sending steps on the terminal device side in the embodiments of this application. The processing unit 1220 is configured to perform step 602 in FIG. 6, and/or the processing unit 1220 is further configured to perform another processing step on the terminal device side in the embodiments of this application.

In a specific implementation, the transceiver unit 1210 is configured to perform the receiving operation on the terminal device side in step 701 in FIG. 7, and/or the transceiver unit 1210 is further configured to perform other receiving and sending steps on the terminal device side in the embodiments of this application. The processing unit 1220 is configured to perform step 702 in FIG. 7, and/or the processing unit 1220 is further configured to perform another processing step on the terminal device side in the embodiments of this application.

In a specific implementation, the transceiver unit 1210 is configured to perform the receiving operation on the terminal device side in step 701 in FIG. 8, and/or the transceiver unit 1210 is further configured to perform other receiving and sending steps on the terminal device side in the embodiments of this application. The processing unit 1220 is configured to perform steps 803 and 804 in FIG. 8, and/or the processing unit 1220 is further configured to perform another processing step on the terminal device side in the embodiments of this application.

In a specific implementation, the transceiver unit 1210 is configured to perform the obtaining operation on the terminal device side in step 901 in FIG. 9, and/or the transceiver unit 1210 is further configured to perform other receiving and sending steps on the terminal device side in the embodiments of this application. The processing unit 1220 is configured to perform step 903 in FIG. 8, and/or the processing unit 1220 is further configured to perform another processing step on the terminal device side in the embodiments of this application.

In a specific implementation, the transceiver unit 1210 is configured to perform a receiving operation on the terminal device side in step 1002 in FIG. 10, and/or the transceiver unit 1210 is further configured to perform other receiving and sending steps on the terminal device side in the embodiments of this application. The processing unit 1220 is configured to perform steps 1003 and 1004 in FIG. 10, and/or the processing unit 1220 is further configured to perform another processing step on the terminal device side in the embodiments of this application.

Figure 13:
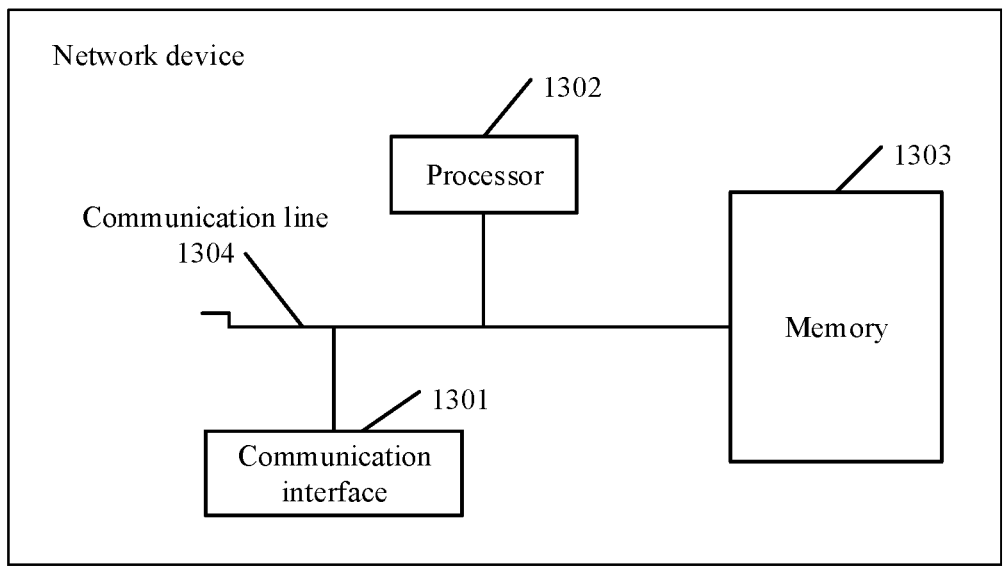
FIG. 13 is a schematic diagram of a structure of hardware of another communication device according to an embodiment of this application.

In addition, the network device may be implemented by a communication device in FIG. 13. FIG. 13 is a schematic diagram of a hardware structure of the communication device according to an embodiment of this application. The communication device includes a communication interface 1301 and a processor 1302, and may further include a memory 1303.

The communication interface 1301 is configured to communicate with another device or communication network by using any apparatus such as a transceiver.

The processor 1302 includes but is not limited to one or more of a central processing unit (CPU), a network processor (NP), an application-specific integrated circuit (ASIC), or a programmable logic device (PLD). The PLD may be a complex programmable logic device (CPLD), a field-programmable logic gate array (FPGA), generic array logic (GAL), or any combination thereof. The processor 1302 is responsible for a communication line 1304 and general processing, and may further provide various functions, including timing, peripheral interfacing, voltage regulation, power management, and another control function. The memory 1303 may be configured to store data used by the processor 1302 when the processor 1302 performs an operation.

The memory 1303 may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM), another optical disk storage, an optical disc storage (including a compact disc, a laser disc, an optical disc, a digital versatile disc, a Blu-ray disc, and the like), a disk storage medium, another magnetic storage device, or any other medium that can be used to carry or store expected program code in a form of an instruction or a data structure and that can be accessed by a computer. However, this is not limited thereto. The memory may exist independently, and is connected to the processor 1302 through the communication line 1304. Alternatively, the memory 1303 may be integrated into the processor 1302. If the memory 1303 and the processor 1302 are mutually independent components, the memory 1303 is connected to the processor 1302. For example, the memory 1303 and the processor 1302 may communicate with each other through the communication line. The memory 1303 may communicate with the processor 1302 through the communication line, or the memory 1303 may be directly connected to the processor 1302.

The communication line 1304 may include any quantity of interconnected buses and bridges, and the communication line 1304 links together various circuits including one or more processors 1302 represented by the processor 1302 and a memory represented by the memory 1303. The communication line 1304 may further link various other circuits such as a peripheral device, a voltage stabilizer, and a power management circuit. These are well known in the art, and therefore are not further described in this application.

In a specific implementation, the network device may include:
- a memory, configured to store computer-readable instructions; and
- a communication interface coupled to the memory, where the communication interface is configured to perform the following operations:
  sending a first message, where the first message carries target adjustment information; and
  sending a second message, where the second message carries a timing advance (TA), and the target adjustment information and the TA are used by a terminal device to adjust uplink sending time.

In a specific implementation, the memory is specifically configured to store a correspondence between the target adjustment information and a subcarrier spacing, where the correspondence is further stored in the terminal device.

In a specific implementation, the target adjustment information is adjustment information of uplink sending time corresponding to a target subcarrier spacing.

In a specific implementation, the communication interface is specifically configured to send a system information block (SIB) 1 message, where the SIB 1 message carries the target adjustment information.

In a specific implementation, the communication interface is specifically configured to send a downlink control information (DCI) message, where the DCI message carries the target adjustment information.

In a specific implementation, the processor is specifically configured to: calculate an RA-RNTI based on a time-frequency location of the message msg1, and scramble a CRC code by using RA-RNTI+ξ.

The communication interface is specifically configured to send a random access response message msg2, where the message msg2 includes a cyclic redundancy check (CRC) code, and the CRC code is scrambled by using a random access radio network temporary identifier (RA-RNTI) and the target adjustment information.

In a specific implementation, the network device includes a first network device and a second network device. The first network device includes a first communication interface, the second network device includes a second communication interface, the first communication interface is specifically configured to send a system information block (SIB) 1 message, where the SIB 1 message carries first target adjustment information. The second communication interface is specifically configured to send a downlink control information (DCI) message, where the DCI message carries second target adjustment information.

In a specific implementation, the processor is specifically configured to bind the PCI to α.

Figure 14:
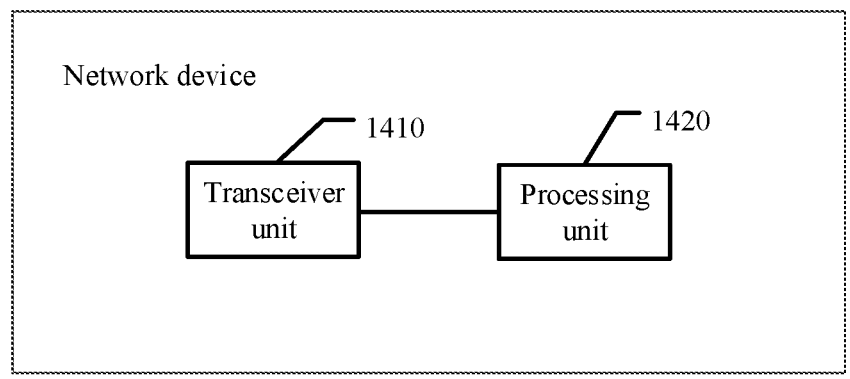
FIG. 14 is a schematic diagram of a structure of a network device according to an embodiment of this application.

In this embodiment of this application, the communication interface may be considered as a transceiver unit of the network device, the processor that has a processing function may be considered as a processing unit of the network device, and the memory is considered as a storage unit of the network device. As shown in FIG. 14, the network device includes a transceiver unit 1410 and a processing unit 1420. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1410 and that is configured to implement a receiving function may be considered as a receiving unit, and a component that is in the transceiver unit 1410 and that is configured to implement a sending function may be considered as a sending unit. In other words, the transceiver unit 1410 includes the receiving unit and the sending unit. The transceiver unit sometimes may also be referred to as a transceiver machine, a transceiver, a transceiver circuit, or the like. The receiving unit sometimes may also be referred to as a receiving machine, a receiver, a receiving circuit, or the like. The sending unit sometimes may also be referred to as a transmitter machine, a transmitter, a transmitter circuit, or the like.

In a specific implementation, the transceiver unit 1410 is configured to perform the receiving and sending operations on a network device side in steps 501 and 502 in FIG. 5, and/or the transceiver unit 1410 is further configured to perform other receiving and sending steps on the network device side in the embodiments of this application.

In a specific implementation, the transceiver unit 1410 may be configured to perform the receiving and sending operation on a network device side in steps 501 and 502 in FIG. 5, the receiving and sending operations on a network device side in step 601 in FIG. 6, or receiving and sending operations on a network device side in step 701 in FIG. 7; and/or the transceiver unit 1410 is further configured to perform other receiving and sending steps on the network device side in the embodiment corresponding to FIG. 5, FIG. 6, or FIG. 7.

In a specific implementation, the transceiver unit 1410 may be configured to perform the receiving and sending operations on a network device side in step 802 in FIG. 8, and/or the transceiver unit 1410 is further configured to perform other receiving and sending steps on the network device side in the embodiments of this application. The processing unit 1420 is configured to perform step 801 in FIG. 8, and/or the processing unit 1420 is further configured to perform another processing step on the network device side in the embodiments of this application.

In a specific implementation, the processing unit 1420 is configured to perform step 901 in FIG. 9, and/or the processing unit 1420 is further configured to perform another processing step on the network device side in the embodiments of this application.

All or some of the foregoing embodiments may be implemented by software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

A person of ordinary skill in the art may understand that all or some of the steps of the methods in the embodiments may be implemented by a program instructing related hardware. The program may be stored in a computer-readable storage medium. The storage medium may include: a ROM, a RAM, a magnetic disk, or an optical disc.

The foregoing describes in detail the communication method, the terminal device, the network device, and the storage medium provided in the embodiments of this application. Specific examples are used in this specification to describe principles and implementations of this application. The descriptions in the foregoing embodiments are merely used to help understand the method and a core idea of this application. In addition, a person of ordinary skill in the art may make changes in specific implementations and application scopes based on the ideas of this application. In conclusion, content of this specification should not be construed as a limitation on this application.

What is claimed is:

1. A communication method, comprising:
 receiving, by a terminal device, a first message from a base station, wherein the first message includes target adjustment information;
 receiving, by the terminal device, a second message, wherein the second message includes a timing advance (TA);
 determining, by the terminal device based on the target adjustment information, a delay time;
 determining, by the terminal device based on the TA, a first uplink sending time; and
 adjusting, by the terminal device, an uplink sending time by delaying the first uplink sending time with the delay time.

2. The method according to claim 1, wherein the delay time is determined based on a correspondence between the target adjustment information and a first subcarrier spacing, wherein the first subcarrier spacing is a subcarrier spacing used by the terminal device, and the correspondence is prestored in the terminal device.

3. The method according to claim 1, wherein the target adjustment information indicates an adjustment time of the uplink sending time corresponding to a second subcarrier spacing, and
 wherein determining, by the terminal device based on the target adjustment information, the delay time comprises:
 in response to that a subcarrier spacing of the terminal device is a third subcarrier spacing, determining, by the terminal device, the delay time based on a preset relationship between the third subcarrier spacing and the second subcarrier spacing.

4. The method according to claim 1, wherein receiving, by the terminal device, the first message comprises:
 receiving, by the terminal device, a system information block (SIB) 1 message, wherein the SIB 1 message includes the target adjustment information.

5. The method according to claim 1, wherein receiving, by the terminal device, the first message comprises:
 receiving, by the terminal device, a downlink control information (DCI) message, wherein the DCI message includes the target adjustment information.

6. The method according to claim 1, wherein receiving, by the terminal device, the first message comprises:
 receiving, by the terminal device, a random access response message msg2, wherein the random access response message msg2 comprises a cyclic redundancy check (CRC) code, and the CRC code is scrambled by using a random access radio network temporary identifier (RA-RNTI) and the target adjustment information; and
 before determining, by the terminal device based on the target adjustment information, a delay time, the method further comprises:
 performing, by the terminal device, a descrambling operation on the CRC code to obtain the target adjustment information.

7. The method according to claim 1, wherein receiving, by the terminal device, the first message comprises:

receiving, by the terminal device, a system information block (SIB) 1 message, wherein the SIB 1 message includes first target adjustment information; and receiving, by the terminal device, a downlink control information (DCI) message, wherein the DCI message includes second target adjustment information, and wherein the delay time is determined based on the first target adjustment information, the second target adjustment information, and the TA.

8. The method according to claim 1, wherein receiving, by the terminal device, the first message comprises:

obtaining, by the terminal device, a physical cell identifier (PCI), wherein the PCI is bound to an included angle α, and the included angle α is a horizontal included angle between a cell and a satellite; and wherein the delay time is determined based on the included angle α and according to a preset formula.

9. The method according to claim 1, wherein receiving, by the terminal device, the first message comprises:

receiving, by the terminal device, a broadcast message sent by a satellite, wherein the broadcast message includes location information of the satellite; and wherein the delay time is determined based on location information of the terminal device and the location information of the satellite.

10. The method according to claim 1, wherein the method further comprises:

after sending a message msg3 scheduled and transmitted for the first time, starting, by the terminal device, a first timer after a preset duration, wherein the first timer monitors a contention resolution message msg4.

11. A communication method, comprising:

sending, by a network device to a terminal device, a first message, wherein the first message includes target adjustment information;

sending, by the network device to the terminal device, a second message, wherein the second message includes a timing advance (TA), and the target adjustment information is used to determine a delay time, and wherein the TA is used to determine a first uplink sending time;

receiving, from the terminal device, an uplink transmission sent at an uplink sending time, wherein the uplink sending time is the first uplink sending time delayed by the delay time.

12. A terminal device, comprising:

at least one processor coupled to a communication interface;

the communication interface coupled to one or more memories;

the one or more memories coupled to the at least one processor and storing computer-readable instructions for execution by the at least one processor to:

receive, through the communication interface, a first message from a base station, wherein the first message includes target adjustment information;

receive, through the communication interface, a second message, wherein the second message includes a timing advance (TA);

determine, based on the target adjustment information, a delay time;

determine, based on the TA, a first uplink sending time; and adjust an uplink sending time by delaying the first uplink sending time with the delay time.

13. The terminal device according to claim 12, wherein the delay time is determined based on a correspondence between the target adjustment information and a first subcarrier spacing, wherein the first subcarrier spacing is a subcarrier spacing used by the terminal device and the correspondence is prestored in the terminal device.

14. The terminal device according to claim 12, wherein the target adjustment information indicates an adjustment time of the uplink sending time corresponding to a second subcarrier spacing, and wherein the one or more memories store the computer-readable instructions for execution by the at least one processor to:

in response to that a subcarrier spacing of the terminal device is a third subcarrier spacing, determine the delay time based on a preset relationship between the third subcarrier spacing and the second subcarrier spacing.

15. The terminal device according to claim 12, wherein the communication interface is configured to receive a system information block (SIB) 1 message, wherein the SIB 1 message includes the target adjustment information.

16. The terminal device according to claim 12, wherein the communication interface is configured to receive a downlink control information (DCI) message, wherein the DCI message includes the target adjustment information.

17. The terminal device according to claim 12, wherein the communication interface is configured to receive a random access response message msg2, wherein the random access response message msg2 comprises a cyclic redundancy check (CRC) code, and the CRC code is scrambled by using a random access radio network temporary identifier (RA-RNTI) and the target adjustment information; and wherein the one or more memories store the computer-readable instructions for execution by the at least one processor to perform a descrambling operation on the CRC code to obtain the target adjustment information.

18. The terminal device according to claim 12, wherein the communication interface is configured to receive a system information block (SIB) 1 message, wherein the SIB 1 message includes first target adjustment information; and the communication interface is configured to receive a downlink control information (DCI) message, wherein the DCI message includes second target adjustment information, and wherein the delay time is determined based on the first target adjustment information, the second target adjustment information, and the TA.

19. The terminal device according to claim 12, wherein the communication interface is configured to obtain a physical cell identifier (PCI), wherein the PCI is bound to an included angle α, and the included angle α is a horizontal included angle between a cell and a satellite, and wherein the delay time is determined based on the included angle α.

20. The terminal device according to claim 12, wherein the one or more memories are integrated into the at least one processor.

* * * * *

UNITED STATES PATENT AND TRADEMARK OFFICE
CERTIFICATE OF CORRECTION

| | | |
|---|---|---|
| PATENT NO. | : 11,924,793 B2 | Page 1 of 1 |
| APPLICATION NO. | : 17/508564 | |
| DATED | : March 5, 2024 | |
| INVENTOR(S) | : Chuili Kong et al. | |

It is certified that error appears in the above-identified patent and that said Letters Patent is hereby corrected as shown below:

In the Claims

Column 38, Line 7, Claim 1, please delete "device" and insert therefore -- device, --.

Signed and Sealed this
Eighteenth Day of June, 2024

Katherine Kelly Vidal
*Director of the United States Patent and Trademark Office*